US007283580B2

(12) United States Patent
Cumeralto et al.

(10) Patent No.: US 7,283,580 B2
(45) Date of Patent: Oct. 16, 2007

(54) SPREAD SPECTRUM METER READING SYSTEM UTILIZING LOW-SPEED/HIGH-POWER FREQUENCY HOPPING

(75) Inventors: Scott Cumeralto, Spokane, WA (US); John MacConnell, LaCanada, CA (US)

(73) Assignee: Itron, Inc., Spokane, WA (US)

( * ) Notice: Subject to any disclaimer, the term of this patent is extended or adjusted under 35 U.S.C. 154(b) by 617 days.

(21) Appl. No.: 09/911,840

(22) Filed: Jul. 23, 2001

(65) Prior Publication Data

US 2002/0109607 A1    Aug. 15, 2002

Related U.S. Application Data

(60) Provisional application No. 60/220,015, filed on Jul. 21, 2000.

(51) Int. Cl.
    *H04B 1/00* (2006.01)
(52) U.S. Cl. .................. 375/137; 340/870.03
(58) Field of Classification Search ............... 375/132, 375/135, 136, 140, 137, 134; 340/870.02, 340/870.03, 870.11, 870.39, 870.18, 825.39, 340/825.43, 825.36
See application file for complete search history.

(56) References Cited

U.S. PATENT DOCUMENTS

| | | | |
|---|---|---|---|
| 4,940,976 A * | 7/1990 | Gastouniotis et al. | 340/870.02 |
| 5,056,107 A | 10/1991 | Johnson et al. | |
| 5,377,232 A | 12/1994 | Davidov et al. | |
| 5,430,759 A | 7/1995 | Yokev et al. | |
| 5,499,266 A | 3/1996 | Yokev et al. | |
| 5,515,369 A | 5/1996 | Flammer, III et al. | |
| 5,528,621 A | 6/1996 | Heiman et al. | |

(Continued)

FOREIGN PATENT DOCUMENTS

EP    0178804    4/1984

(Continued)

OTHER PUBLICATIONS

John G. Proakis, "Digital Communications", Fourth Edition, Aug. 15, 2000, McGraw-Hill Science/Engineering/Math, pp. 192-194 and 729.*

*Primary Examiner*—Khanh Tran
(74) *Attorney, Agent, or Firm*—Patterson, Thuente, Skaar & Christensen, P.A.

(57) ABSTRACT

A spread spectrum meter reading system enables the use of high power frequency hopping spread spectrum (HPSS) transmissions at both the encoder transmitter and repeater levels of the meter reading system. A plurality of end point encoder transmitter devices are each connected to a utility meter and transmit high power FHSS signals containing at least metering data for the corresponding utility meter. A plurality of intermediate transceiver units that are fewer in number than the number of end point encoder transmitter devices both receives and retransmits the high power FHSS signals. A base station includes a receiver that receives the high power FHSS signals. Preferably, the base station can receive the high power FHSS signals from both the encoder transmitter devices and the intermediate transceiver units and the intermediate transceiver units aggregates metering data from multiple encoder transmitter devices prior to block retransmission of the metering data to the base station. Preferably, the high power FHSS signals are transmitted at a maximum hopping rate of at least one minute per hop to reduce power consumption and increase battery life of the devices.

12 Claims, 19 Drawing Sheets

U.S. PATENT DOCUMENTS

| | | | |
|---|---|---|---|
| 5,546,422 A | 8/1996 | Yokev et al. | |
| 5,604,768 A | 2/1997 | Fulton | |
| 5,626,630 A * | 5/1997 | Markowitz et al. | 607/60 |
| 5,661,750 A | 8/1997 | Fulton | |
| 5,712,867 A | 1/1998 | Yokev et al. | |
| 5,748,104 A * | 5/1998 | Argyroudis et al. | 340/870.11 |
| 5,870,426 A | 2/1999 | Yokev et al. | |
| 5,874,903 A * | 2/1999 | Shuey et al. | 340/870.02 |
| 5,914,672 A * | 6/1999 | Glorioso et al. | 340/870.02 |
| 6,014,089 A * | 1/2000 | Tracy et al. | 340/870.02 |
| 6,047,016 A | 4/2000 | Ramberg et al. | |
| 6,137,423 A | 10/2000 | Glorioso et al. | |
| 6,178,197 B1 | 1/2001 | Froelich et al. | |
| 6,188,715 B1 * | 2/2001 | Partyka | 375/134 |
| 6,195,018 B1 | 2/2001 | Ragle et al. | |
| 6,208,696 B1 * | 3/2001 | Giles | 375/272 |
| 6,246,677 B1 * | 6/2001 | Nap et al. | 370/346 |
| 6,300,881 B1 | 10/2001 | Yee et al. | |
| 6,535,544 B1 * | 3/2003 | Partyka | 375/132 |
| 6,574,509 B1 * | 6/2003 | Kraus et al. | 607/60 |
| 6,778,099 B1 * | 8/2004 | Meyer et al. | 340/870.02 |
| 6,804,559 B1 * | 10/2004 | Kraus et al. | 607/32 |
| 6,893,395 B1 * | 5/2005 | Kraus et al. | 600/300 |

FOREIGN PATENT DOCUMENTS

| | | |
|---|---|---|
| WO | WO98/59427 | 12/1998 |
| WO | WO98/59429 | 12/1998 |
| WO | WO98/59444 | 12/1998 |
| WO | WO98/59445 | 12/1998 |
| WO | WO98/59446 | 12/1998 |
| WO | WO01/10070 | 2/2001 |

* cited by examiner

SPREAD SPECTRUM METER READING SYSTEM UTILIZING LOW-SPEED/HIGH-POWER FREQUENCY HOPPING

CLAIM TO PRIORITY

The present application claims priority to U.S. provisional patent application No. 60/220,015, entitled "Powerful Encoder Transmitter", and filed Jul. 21, 2000. The contents of this provisional application are hereby incorporated by reference in its entirety.

FIELD OF THE INVENTION

The present invention relates to utility metering systems and, more particularly, to a utility metering system that utilizes frequency hopping spread spectrum wireless communication to transmit utility consumption data.

BACKGROUND OF THE INVENTION

Wireless automatic meter reading systems are well known. Typically, each utility meter is provided with a battery-powered encoder that collects meter readings and periodically transmits those readings over a wireless network to a central station. The power limitations imposed by the need for the encoder to be battery powered and by regulations governing radio transmissions effectively prevent direct radio transmissions to the central station. Instead, wireless meter reading systems typically utilize a layered network of overlapping intermediate receiving stations that receive transmissions from a group of meter encoders and forward those messages on to the next higher layer in the network as described, for example, in U.S. Pat. No. 5,056,107. These types of layered wireless transmission networks allow for the use of lower power, unlicensed wireless transmitters in the thousands of encoder transmitters that must be deployed as part of a utility meter reading system for a large metropolitan area.

In 1985, as an attempt to stimulate the production and use of wireless network products, the FCC modified Part 15 of the radio spectrum regulation, which governs unlicensed devices. The modification authorized wireless network products to operate in the industrial, scientific, and medical (ISM) bands using spread spectrum modulation. The ISM frequencies that may be used include 902 to 928 MHz, 2.4 to 2.4835 GHz, and 5.725 to 5.850 GHz. The FCC allows users to operate wireless products, such as utility metering systems, without obtaining FCC licenses if the products meet certain requirements. This deregulation of the frequency spectrum eliminates the need for the user organizations to perform cost and time-consuming frequency planning to coordinate radio installations that will avoid interference with existing radio systems.

Spread spectrum modulators use one of two methods to spread the signal over a wider area. The first method is that of direct sequence spread spectrum, or DSSS, while the second is frequency hopping spread spectrum, or FHSS. DSSS combines a data signal at the sending station with a higher data rate bit sequence, which many refer to as a chipping code (also known as a processing gain). A high processing gain increases the signals resistance to interference. FHSS, on the other hand, relies on the distribution of a data signal randomly hopped across a number of defined frequency channels to avoid interference. While DSSS has higher potential data transmission rates than FHSS, DSSS is much more costly than FHSS and has higher power consumption.

U.S. Pat. No. 5,661,750 describes a DSSS system for utility metering that is designed to utilize a high power transmitter and still meet the requirements of FCC Part 15.247. Specifically, in this system, the transmitter utilizes a modulator to modulate the transmission signal with a pseudo-random pattern to spread the signal across a broader bandwidth than the original signal and uses a second modulator to modulate a preamble of the signal with a phase reversal pattern. The phase reversal pattern increases the number of spectrum lines produced by the transmitter and thereby decreases the power density of the broadcast signal, which for DSSS is +8 dBm in any three KHz bandwidth. However, while the phase reversal pattern addresses the low power density requirement, it does not address of the increased cost associated with DSSS—in fact, the addition of a phase reversal modulator likely adds to the cost of the transmitter. Further, it does not address that the DSSS receiver is still significantly vulnerable to noise, and it does not address the issue that only time, rather than time and frequency, may be used for signal collision avoidance; features which are significant and important in a utility sub-metering application.

FHSS operates by taking the data signal and modulating it with a carrier signal that hops from frequency to frequency as a function of time over a wide band of frequencies. With FHSS, the carrier frequency changes periodically. The frequency hopping technique reduces interference because an interfering signal from a narrowband system will only affect the spread spectrum signal if both are transmitting at the same frequency and at the same time. Thus, the aggregate interference will be very low, resulting in little or no bit errors.

A hopping code determines the frequencies the radio will transmit and in which order. To properly receive the signal, the receiver must be set to the same hopping code and listen to the incoming signal at the right time and correct frequency. If the radio encounters interference on one frequency, then the radio will retransmit the signal on a subsequent hop on another frequency. Because of the nature of its modulation technique, FHSS can achieve up to 2 Mbps data rates. It is possible to have operating radios use FHSS within the same frequency band and not interfere, assuming they each use a different hopping pattern.

U.S. Pat. Nos. 5,430,759, 5,499,266, 5,546,422, 5,712,867 and 5,870,426 describe a FHSS system for a paging network to provide low power communications to mobile pagers over an extended coverage area. Although utility metering is identified in these patents as a potential application for the paging network, there are important differences between paging systems and utility meter reading systems that restrict the ability to successfully utilize paging network FHSS technology in a utility meter reading application. Unlike paging systems in which the pager is mobile, the utility meter encoder transmitter is fixed in a single location and reception coverage areas are effectively dictated by the antenna pattern available from that location. While two-way paging system can provide limited communication from a pager to the network, the paging system is not designed to handle continuous periodic reporting of large amounts of data by a large number of units concentrated in a relatively small area.

One of the problems with meter reading applications in the context of wireless radio networks is the potential for collisions between transmissions of a large number of units concentrated in a relatively small area. This problem is particularly acute, for example, in the context of sub-metering applications which involve the allocation of utility usage readings over a large number of units in an apartment, high rise, office building or other dwelling were multiple utility accounts may be located in the same building or in the same building complex. Sub-metering applications also tend to present severe challenges in terms of installation and operation due to structures limiting or blocking effective antenna coverage.

One meter reading system which has been developed for the sub-metering application is the Inovonics Tap Watch® system. In this system, the end point encoder transmitters attached to each utility meter utilize a low power FHSS transmitter having less than 0.5 mW of power and operating under FCC Part 15.249. A network of intermediate repeaters receive the low power FHSS transmissions from the end point transmitters and convert these transmission to DSSS transmissions that are retransmitted by high power transmitter operating under FCC Part 15.247 to base stations for collection and processing. While this approach allows for the use of lower cost end point encoder transmitters, it increases the costs of the intermediate repeaters. Moveover, because the end point encoder transmitters are low power, their transmission range is limited and more intermediate repeaters are required for effective coverage in a sub-metering utility application, for example, thereby further increasing the overall costs of the system.

In view of the above, there is a need for a utility meter reading system that is particularly suited to utility sub-metering, that complies with Part 15.247 of the FCC rules governing spread spectrum devices and that enables a lower overall system while allowing for use of long life battery-operated end-point transmitters and intermediate repeaters, and that also enables improved signal collision avoidance.

SUMMARY OF THE INVENTION

The present invention is a spread spectrum meter reading system that enables the use of high power frequency hopping spread spectrum (HPSS) transmissions at both the encoder transmitter and repeater levels of the meter reading system. A plurality of end point encoder transmitter devices are each connected to a utility meter and transmit high power FHSS signals containing at least metering data for the corresponding utility meter. A plurality of intermediate transceiver units that are fewer in number than the number of end point encoder transmitter devices both receives and retransmits the high power FHSS signals. A base station includes a receiver that receives the high power FHSS signals. Preferably, the base station can receive the high power FHSS signals from both the encoder transmitter devices and the intermediate transceiver units and the intermediate transceiver units aggregates metering data from multiple encoder transmitter devices prior to block retransmission of the metering data to the base station. Preferably, the high power FHSS signals are transmitted at a maximum hopping rate of at least one minute per hop to reduce power consumption and increase battery life of the devices.

Unlike the existing techniques, the present invention affords a more efficient meter reading system in terms of costs and deployment. The use of high power FHSS signals at both the end point and intermediate levels reduces the costs of these devices, while at the same time reducing the number of intermediate transceivers that need to be deployed to provide effective coverage, particularly in sub-metering applications. The high power FHSS signals comply with FCC Part 15.247.

In one embodiment, the meter end point encoder transmitter device includes a radio frequency sub-system that transmits consumption data from the utility meter using frequency hopping spread spectrum signal and a digital subsystem with a first processor and a second processor. The first processor runs continuously and controls the operation of the radio frequency sub-system, and the second processor runs only upon utilization of the radio frequency sub-system.

In another embodiment, the meter end point encoder transmitter device includes a radio frequency sub-system that transmits consumption data from the utility meter using frequency hopping spread spectrum signal and a digital subsystem powered by a battery. Upon nearing a time for the radio frequency sub-system to transmit, the digital subsystem directs a charge pump capacitor to charge. Once the charge pump capacitor is charged, the digital sub-system enables at least a portion of the radio frequency sub-system to run off the charge pump capacitor during the consumption data transmission.

In another embodiment, the meter end point encoder transmitter devices are configured to operate for an initial period of time after installation in a installation mode that uses a high-speed frequency hopping spread spectrum mode, instead of the normal low-speed frequency hopping mode. The high-speed mode allows simplifies installation and minimizes delays that would otherwise be required while the encoder transmitter initiated FHSS transmissions with a repeater or base station if operating in low-speed mode.

In still another embodiment, the meter end point encoder transmitter device transmits consumption data to at least the base unit such that the transmitted consumption data is in the form of a plurality of buckets of data, each bucket representing a period of time of consumption data from which the base unit may retrieve desired consumption data.

In still another embodiment, each of the encoder transmitter devices and the transceiver units incorporates a transmission counter value that is maintained by that device or unit and is used to calculate latency information. The base station time stamps each received transmission with a real time clock such that accurate calculation of the actual meter reading time can be determined from the combination of the time stamp and the latency information.

DESCRIPTION OF THE PREFERRED EMBODIMENTS

The utility metering system of the present invention operates to monitor and retain data on a plurality of water, electric, and gas utility meters, e.g., up to 1000 utility meters, that are typically located within multi-dwelling or high-rise environments.

I. System Components

Figure 1:
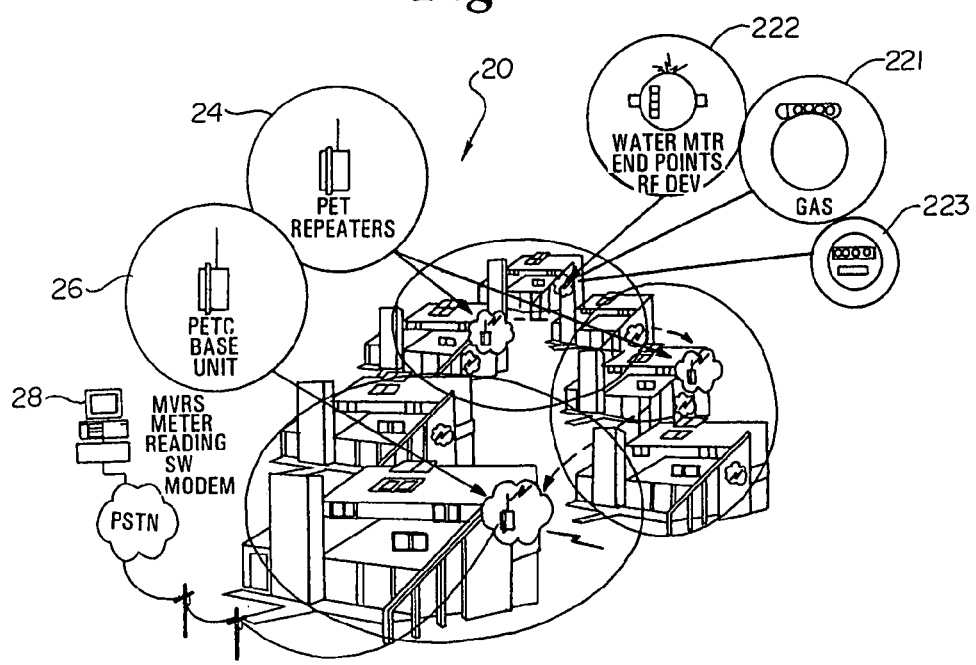
FIG. 1 is an overview diagram of an embodiment of the utility sub-metering system of the present invention.

Referring to FIG. 1, the utility metering system 20 generally comprises a plurality of meter end point encoder transmitter devices, or PET modules 22, that include gas PET modules 221, water PET modules 222, and electric PET modules 223. The system 20 further comprises a plurality of repeater units 24, one or more base units 26, and a head-end, software-driven, meter reading analysis device 28.

I.A. PET Module

Each PET module 22 is preferably a radio frequency (RF) transmit-only device that gathers and encodes utility consumption and tamper information, then transmits this data with other information via RF to the repeater units 24 or base units 26 periodically, for example, every 10 to 15 minutes using a high power frequency hopping spread spectrum (FHSS) technology. The electric PET modules 223 are preferably installed under the glass of standard meters and do not require battery power. The PET modules 221 and 222 for gas and water, respectively, are preferably self-contained low power units that are powered by long-life batteries; the PET modules 221 and 222 utilize a very slow "bubble up" rate to minimize power consumption and extend the life of the batteries as well as minimize unnecessary RF interference to other users in the RF band. Each of the PET modules 22 is designed to be installed by the meter manufacturer during the manufacturing process or to be easily retrofitted into existing meters.

The PET module 22 complies with Part 15.247 of the FCC rules governing high power spread spectrum devices (i.e., frequency hopping spread spectrum devices having power outputs of greater than 0.5 mW). The PET module 22 operates in the 900 MHz unlicensed band at a maximum peak power level of 40 milliwatts with a transmission rate not to exceed 50 milliseconds. The PET module 22 is to be permanently mounted such that it retains a distance of 20 centimeters (7.9 inches) from all persons in order to comply with FCC RF exposure levels. The PET module 22 preferably cannot be modified in any way and contains no user serviceable parts.

I.B. Repeater Unit

Each repeater unit 24 collects water, electric, gas and usage data via RF from the PET modules 22 and forwards that data to a base unit 26 via RF. This is preferably accomplished by a store and forward functionality that groups transmissions from multiple PET modules together in a block transmission format, although single store and forward or even immediate retransmission approaches can also be used. Specifically, each repeater unit 24 receives PET module RF transmissions from surrounding PET modules 22, adds a time stamp, and upon a predetermined time, forwards the stored PET module data to other repeater units 24 or base units 26. The repeater unit 24 utilizes frequency hopping spread spectrum (FHSS) on a timed basis to transmit its collected data. Preferably, the transmissions are relatively short, e.g. less than 400 milliseconds, and communicate up to 45 PET module messages per transmission. The repeater unit 24 also provides an identification number with each transmission. The identification numbers of all repeater units 24 in the system 20 are entered into the base unit 26 to allow reception into the system database.

The repeater unit 24 complies with Part 15.247 of the FCC rules governing high power spread spectrum devices. The transceiver of the repeater unit operates in the 900 MHz unlicensed band at a maximum power level of 100 milliwatts with a transmission rate not to exceed one transmission every 20 seconds and a transmission time not to exceed 400 milliseconds. The repeater unit 24 may be mounted in any location however its antenna must be permanently mounted such that it retains a distance of 2 meters (6.7 feet) from all persons in order to comply with FCC RF exposure levels. The repeater unit 24 antenna and coaxial cable cannot be modified in any way and contains no user serviceable parts.

The repeater units 24 are used to counteract antenna interference that may occur in one direction. If the antenna signal of a PET module 22 is blocked by an obstruction, a receiver can not receive the PET module message. The use of the repeater units 24 provides azimuth diversity, i.e., the signal blocked by obstructions can be captured by one or many other repeater units 24 whose antenna patterns overlap that of the PET module 22.

I.C. Base Unit

Each base unit 26 is similar in configuration to the repeater units 24 with the exception that the base unit 26 is equipped to transmit the utility data to the meter-reading analysis device 28. The transmission from the base point encoder transceiver remote collector (PETRC) unit 26 is preferably performed via a standard telephone connection (PSTN) 30 or, alternatively, via a cellular connection. Each base PETRC unit 26 is preferably mounted at a central point in multi-dwelling complex wherein ease of interconnection to power and telephone lines are available. In a preferred embodiment, each base unit 26 can monitor and retain data on up to 1000 PET modules 22. The data gathered from the PET modules 22 and/or repeater units 24 is via a frequency hopping spread spectrum (FHSS) high power RF technology that maximizes the coverage range of each base unit 26, while minimizing the costs of the PET modules 22 and repeater units 24.

I.D. Meter Reading Analysis Device

The meter reading analysis device 28 operates to process the usage data that is preferably sent by the base unit 26 via PSTN or cellular telephone. It will be understood that multiple base units 26 may be deployed across a metropolitan area, for example, to provide effective meter reading coverage as needed. The meter reading analysis device 28 preferably comprises a standard PC whereby it is able of not only processing the data received from the base units 26 but also provides an interactive, graphical user interface to allow users to extract and report key information. The software run by meter reading analysis device is preferably Itron's MV-RS Meter Reading Software.

Further details regarding installation and mounting of the components of the system 20 may be found in the Itron "Installation Guide for the PETRC and PET Repeater Units used in the PETNET Submetering System", Feb. 20, 2001, which is hereby incorporated by reference.

II. System Operation

II. A. PET Module—Hardware Detail

The PET module 22 is a fully synthesized FM transmitter that operates in the 902 to 928 MHz frequency band. The PET module 22 operates pursuant to FCC rule part 15.427 as a frequency hopper capable of utilizing twenty-five channels. The RF nominal output power of the PET module 22 is +15 dBm with a modulation of +/−75 KHz and a message transmission time of 50 milliseconds. The PET module 22 is fully self-contained, including the antenna, and has no user serviceable parts. The PET module operates in an asynchronous mode with a message transmit rate of 10-15 minutes, most preferably 10 minutes, and provides an estimated battery life of five years. The PET modules 22 transmit on a pseudo-random frequency and time, and while capable of sequencing through the twenty-five random frequencies, preferably utilizes only six of the twenty-five acquisition channels, i.e., three lower and three upper acquisition channels through which the PET module rotates. However, any one of the twenty-five channels can be considered an acquisition channel and is dependent on the base unit 26 configuration.

Figure 2:
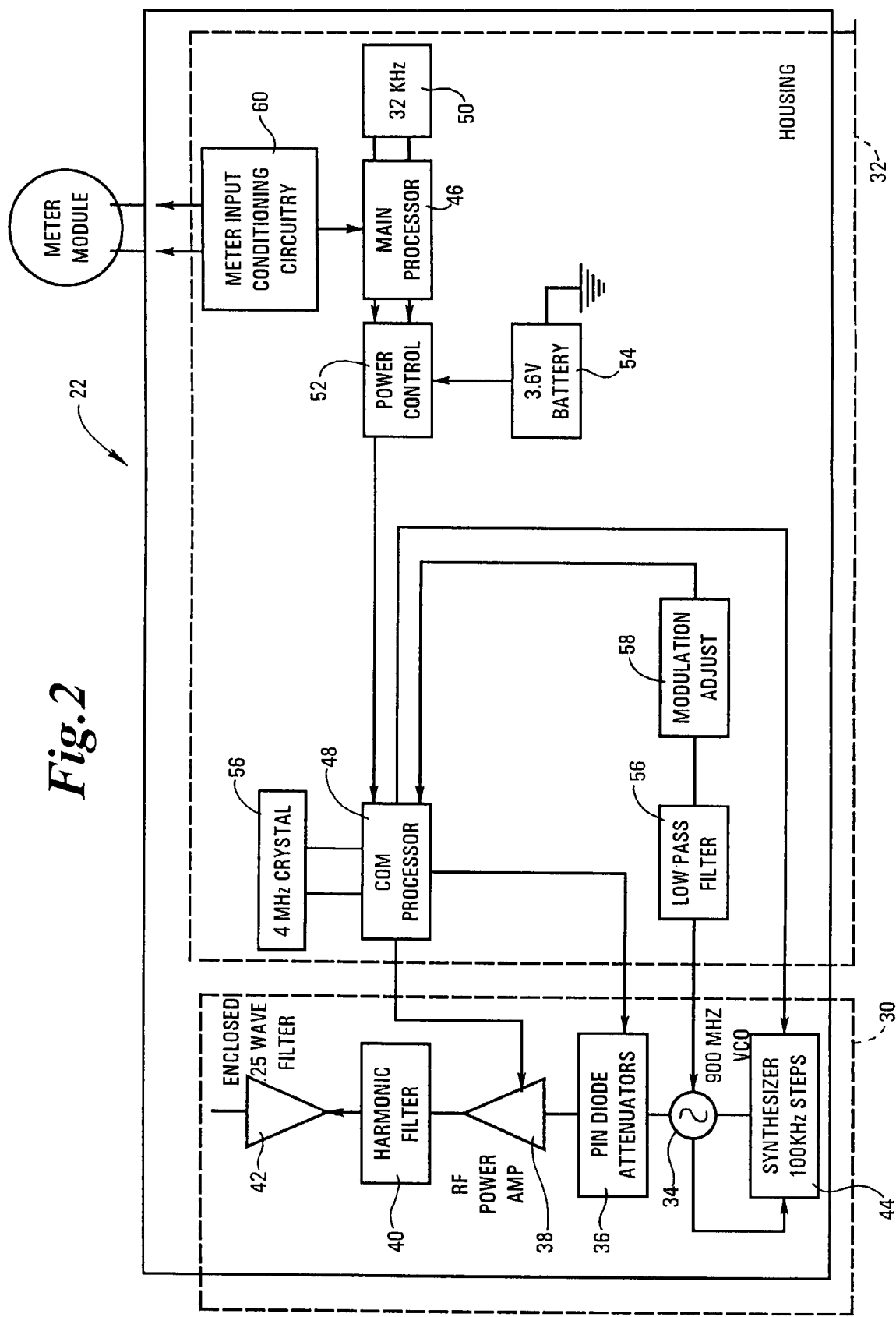
FIG. 2 block diagram of the PET module transmitter of the present invention.

A block diagram depicting the major components of the transmitter of the PET module 22 is provided in FIG. 2. As shown, the PET module 22 utilizes an RF subsystem 30 in combination with a digital subsystem 32. The RF subsystem 30 includes a voltage controlled oscillator (VCO) 34 followed by pin diode attenuators (a.k.a. an RF switch) 36. The RF switch 36 is followed by an RF power amplifier 38 which is followed by a low pass filter 40 for harmonic suppression. The low pass filter 40 is followed by a quarter-wave dipole antenna 42. A frequency synthesizer 44 is provided and operates to tune the VCO 34 to the proper channel and maintain the channel under varying load conditions.

The RF switch 36 is preferably comprised of two PIN diodes that are used as a shut type reflective switch. The PIN diodes are preferably in parallel for RF to reduce their combined "on" impedance to ground, and in series for DC to reduce the current required to operate them. The RF switch 36 is controlled by an emitter follower that is driven by a low pass filter to control the rate at which it turns on and off.

The low pass filter 40 is preferably a fifth order low pass filter that is used to reduce harmonic emissions. In its preferred configuration, the low pass filter 40 utilizes transmission lines instead of inductors, and utilizes two capacitors at each of the three nodes of the filter due to the low self-resonance frequency of the capacitors. This self-resonance occurs in the stopband near the second harmonic, which actually helps to improve the filter performance over what it would otherwise be. The resulting filter has a rather narrow passband response and has an insertion loss around 1 dB.

The digital subsystem 32 includes two microprocessors: (1) the main processor 46; and (2) the communications (COMM) processor 48. The main processor 46 runs continuously, however, at low speed utilizing a 32 KHz oscillator 50 to conserve power. The main processor 46 is programmed with the serial number and hop sequence of the PET module 22 during manufacture. The main processor 46 has the responsibilities within the PET module 22 of overall system timing and supervision including maintaining the position in the hop sequence, accumulating sensor data, operation of the transmitter power supply charge circuit 52 (described below), monitoring the condition of the PET module battery 54, and providing the message to be sent and the frequency to be used to the COMM processor 48 at the PET module message transmission time. The main processor 46 is preferably additionally provided with various test modes to aid in the manufacture and installation of the PET module 22.

For example, upon installation of the PET module 22, the new PET module 22 rotates through all twenty-five acquisition channels until it finds the six acquisition channels upon which it is to transmit to the base unit 26. During normal operation of the PET module 22 such a channel rotation would take over four hours utilizing the standard, established transmission patterns, however, upon installation, the PET module preferably operates in high speed mode wherein the PET module 22 rotates through the twenty-five acquisition channels at a rate of approximately one every ten seconds, for up to forty minutes. Such a high-speed mode allows an installer of the PET module 22 to verify installation and operation within a reasonably short period of time.

The COMM processor 48 only operates when the RF subsystem 30 is being used and utilizes a clock rate of 4 MHz, provided by crystal oscillator 56. The COMM processor 48 receives the PET module message to be sent and the channel upon which to send the message from the main processor 46. The COMM processor 48 operates to compute a 32 bit cyclic redundancy code (CRC) for the message and to set the frequency synthesizer 44 to the proper frequency through monitoring of the VCO 34 via low pass filter 56 and modulation adjust circuitry 58. The COMM processor 48 additionally operates to increase the output power at turn-on to its maximum value in a controlled manner to minimize out-of-band spurs. Like the main processor 46, the COMM processor 48 is preferably provided with various test modes to aid in the manufacture and installation of the PET module 22.

Alternatively, the main processor 46 and COMM processor 48 could be combined as a single, dual-speed hi-lo processor such as that available from Texas Instruments.

The digital subsystem 32 further includes meter input conditioning circuitry 60, i.e., a sensor interface circuit, such as a debounce and divide-by-two circuit to capture short duration pulses without requiring rapid sampling by the main processor 46. However, numerous other types of sensor interface circuits, e.g., register type sensors, may be used as appropriate or desired without departing from the spirit or scope of the invention.

The transmitter power supply charge circuit, indicated in FIG. 2 by block 52 labeled power control, is able to supply a regulated five volts at up to 200 milliAmps during transmission of the PET module message, however current PET module design requires only 50 milliAmps. The nominal charge current for the transmitter power supply charge circuit varies between three milliamps and less than one milliAmp during a charge cycle. The transmitter power supply charge circuit uses a charge pump to slowly charge a large value capacitor, e.g., 4700 microFarads, to approximately six volts. During transmission of the PET module message, the power amplifier 38 runs off of this capacitor allowing the PET module 22 to have a high power transmitter while limiting battery drain.

The PET module transmitter 22 described above is preferably manufactured using a two-sided PC board design. The two-sided design, while more difficult than a multi-layer board design, greatly reduces production costs. Design considerations pertinent to the two-sided design include providing no traces through the ground plane in the RF section, this is a feature that is critical to reliable and repeatable RF performance. Further design considerations include limiting the overall number of traces on the ground plane side of the board for further improved RF performance and utilizing large diameter via holes for RF connections to the ground plane to reduce inductance.

II. B. PET Module—Operation

In operation, the main processor 46 continuously keeps track of time, sensor counts from the utility meter, and tamper counts from the utility meter. At 30 seconds prior to the time to send the PET module message, the main processor 46 supplies 1 KHz pulses to the charge pump of the transmitter supply charge circuit 52 until it receives an indication from the charge pump that the charge pump capacitor is fully charged; if the main processor 46 does not receive a fully charged signal by transmission time a low battery flag is set within the main processor 46.

At the time of transmission and having received an indication of a fully charged capacitor, the main processor 46 initiates operation of the "bubble-up" architecture of the PET module transmitter by turning on the COMM processor 48 and awaiting a response therefrom; if no response is returned, the main processor 46 turns off the COMM processor 48. Upon receiving a response from the COMM processor 48, which comes in the form of a request for PET module message data and frequency transmission data, the main processor 46 replies to the request. After receiving the requested data, the COMM processor 48 checks an interprocessor checksum to determine if it should continue with its message sending operations.

Figure 3:
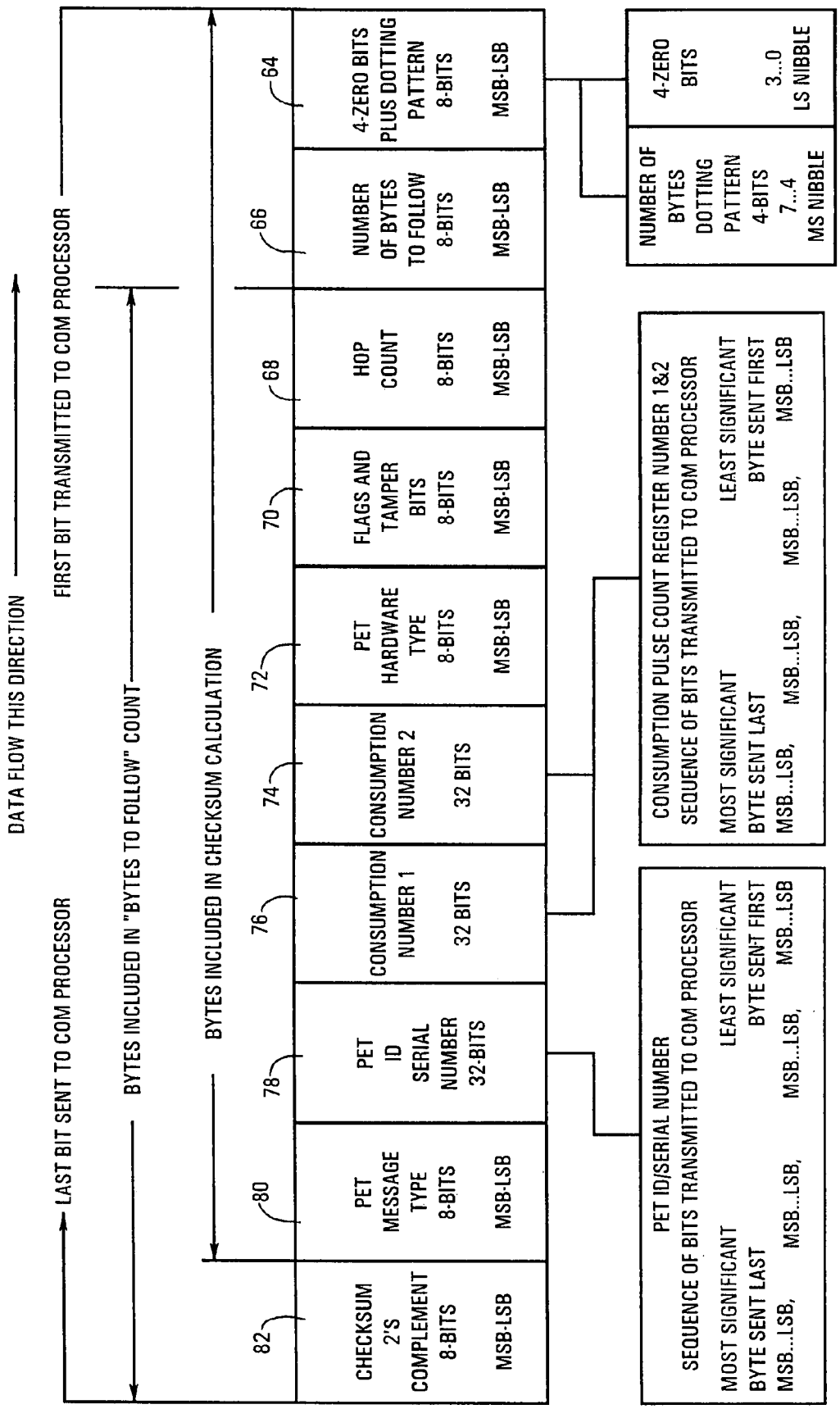
FIG. 3 is a diagram of the message bit sequence from a main processor to a communications processor utilized within the PET module transmitter of FIG. 2.

A diagram of the PET module message bit sequence, which includes the checksum, from the main processor 46 to the COMM processor 48 is provided in FIG. 3. As shown, the message bit sequence includes field 64 that is comprised of four zero bits plus four bits indicating the number of bytes dotting pattern. The message bit sequence further includes field 66 providing eight bits that indicate the number of bytes that will follow. The message bit sequence then provides the bytes comprising the checksum calculation, which comprises fields 68 through 80. Field 68 provides an eight bit hop count, field 70 provides an eight bit transmission indicating transitions in flag and tamper bits, field 72 provides an eight bit indication of the PET module 22 hardware type, field 74 provides a thirty-two bit transmission indicating a consumption pulse count of register two of the utility meter to which the PET module 22 is connected, field 76 provides a thirty-two bit transmission indicating a consumption pulse count of register one of the utility meter to which the PET module 22 is connected, field 78 provides a thirty-two bit transmission that provides the PET module identification/serial number, and field 80 provides an eight bit transmission of the type of message being transmitted by the PET module 22. The last field 82 of the message bit sequence includes an eight bit transmission of a 2's complement of the checksum. Note that in each field the least significant byte (LSB) is transmitted to the COMM processor 48 first with the most significant byte (MSB) transmitted to the COMM processor 48 last.

If the COMM processor 48 determines that it should continue per the checksum, the COMM processor 48 goes through a sequenced turn-on, or "bubble-up" operation, of the transmitter to avoid out-of-band spurious generation. The entire turn-on, send message, and turn-off sequence takes approximately 40 milliseconds. The turn-on sequence preferably occurs as follows:

1. The RF switch 36 between the VCO 34 and power amplifier 38 is turned off, which attenuates the RF to the power amplifier 38 by approximately 10 dB. (Note: The RF switch 36 draws DC current while it is in the "off" state. It does not draw current while it is in the "on" state).
2. The synthesizer 44 frequency is set.
3. A delay for the RF switch 36 to complete turning the RF off is provided.
4. The VCO 34 is turned on. The VCO 34 turns on slowly. The synthesizer 44 locks while the VCO 34 is 10 dB to 20 dB below its normal operating power, which greatly reduces out-of-band spurs that would otherwise occur while the synthesizer 44 locks. The VCO 34 design is preferably such that its frequency does not greatly change as its power level changes.
5. A delay for the synthesizer 44 to stabilize and the VCO 34 to reach full power is provided.
6. The power amplifier 38 is turned on, a quick operation.
7. The RF switch 36 is turned on. It turns on slowly to prevent knocking the synthesizer 44 out of lock, which would generate out-of-band spurs.
8. The 32 bit CRC is computed by the COMM processor 48.
9. A delay to allow the RF switch 36 to turn the RF completely on plus provide a full power unmodulated carrier for the base unit transreceiver to acquire a frequency lock is provided.
10. The PET module message is sent.

The use of the above-described "bubble-up" operation not only provides a transmitter that creates very little co-channel band interference but also provides for a PET module transmitter that has a five year life span without battery replacement (presuming transmissions of once every 600, i.e., 10 minutes, to 900 seconds, i.e., 15 minutes).

Following the transmission of the PET module message, the PET module transmitter is preferably sequenced off to prevent generating out-of-band spurs. The sequence is preferably as follows:

1. The RF switch 36 slowly turns the RF off to avoid knocking the synthesizer 44 out of lock.
2. A delay to allow the RF switch 36 to reach maximum attenuation is provided.
3. The power amplifier 38 is turned off.
4. A delay is provided to complete power amplifier turn off.
5. The VCO 34 is turned off.
6. The RF switch 36 is turned on to conserve current (the RF switch draws current when it is attenuating the RF signal).
7. A message is sent to the main processor 46 from the COMM processor 48 telling it that the PET module message has been transmitted, and to turn off the COMM processor 48 power.
8. The COMM processor 48 then goes into a sleep mode to conserve current.

The use of frequency modulation by the PET module 22 provides for number of benefits, e.g., a frequency synthesized transmit frequency that can be accurately controlled and for a carrier stability of ±100 PPM. Further the use of frequency modulation allows for a simplified manufacturing process of the PET module 22 because the intrinsic accuracy and stability requirements of the microwave VCO are significantly reduced over a free-running design. Additionally, the use of frequency modulation enables the use of narrower receiver bandwidths, e.g., 360 KHz, resulting in improved sensitivity, and allows for a faster more reliable hop synchronization process because the location of each acquisition channel is precisely known, which vastly simplifies the base unit receiver signal processing requirements over what they would be if an FCC Part 15.249 design using a non-synthesized architecture were employed.

As indicated above, the nominal output power of the PET module transmitter is +15 dBm with a narrower band receiver (−110 dBM). When compared to the existing Itron ERT® (−6 dBM with a broader band receiver of −105 dBM) which operates at the power limit of FCC Part 15.249, the present invention offers up to 400 times more "available" power than the Itron ERT®. This increase in effective power is used to improve the existing unacceptably poor link margin and a $R^{-4}$ propagation constant. The transmission range of the PET module 22 transmitter, as compared to an Itron ERT® or any other lower power device operating under FCC Part 15.429, is increased by approximately a factor of up to six times. This reduces the number of intermediate coverage zones (coverage zones created by location of a repeater unit 24 of base unit 26) required by a factor of between five to twenty five times (coverage area increases as a square of an increase in the transmission radius). As such, due to the increased range of the PET module 22 transmitter and the reduced number of intermediate coverage zones required. By reducing both the cost per transceiver and the number of transceivers required to provide effective coverage for a utility meter reading system, the overall cost of system 20 of the present invention is significantly lower than the overall system cost of a utility meter reading system implemented using prior encoder transmitter technology, such as the Itron ERT® modules.

Figure 4:
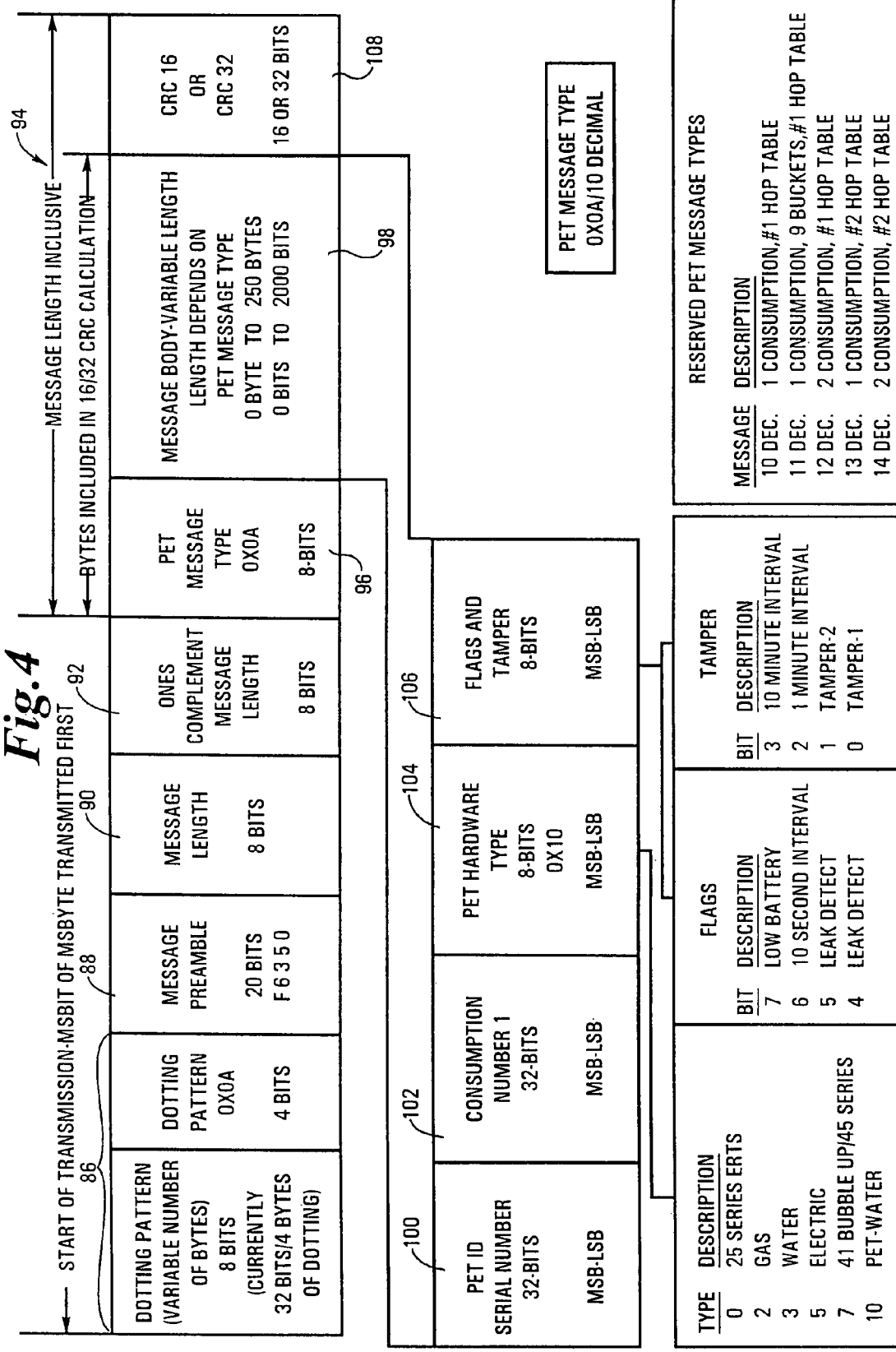
FIG. 4 is an example message structure supported by the system of the present invention.
Figure 5:
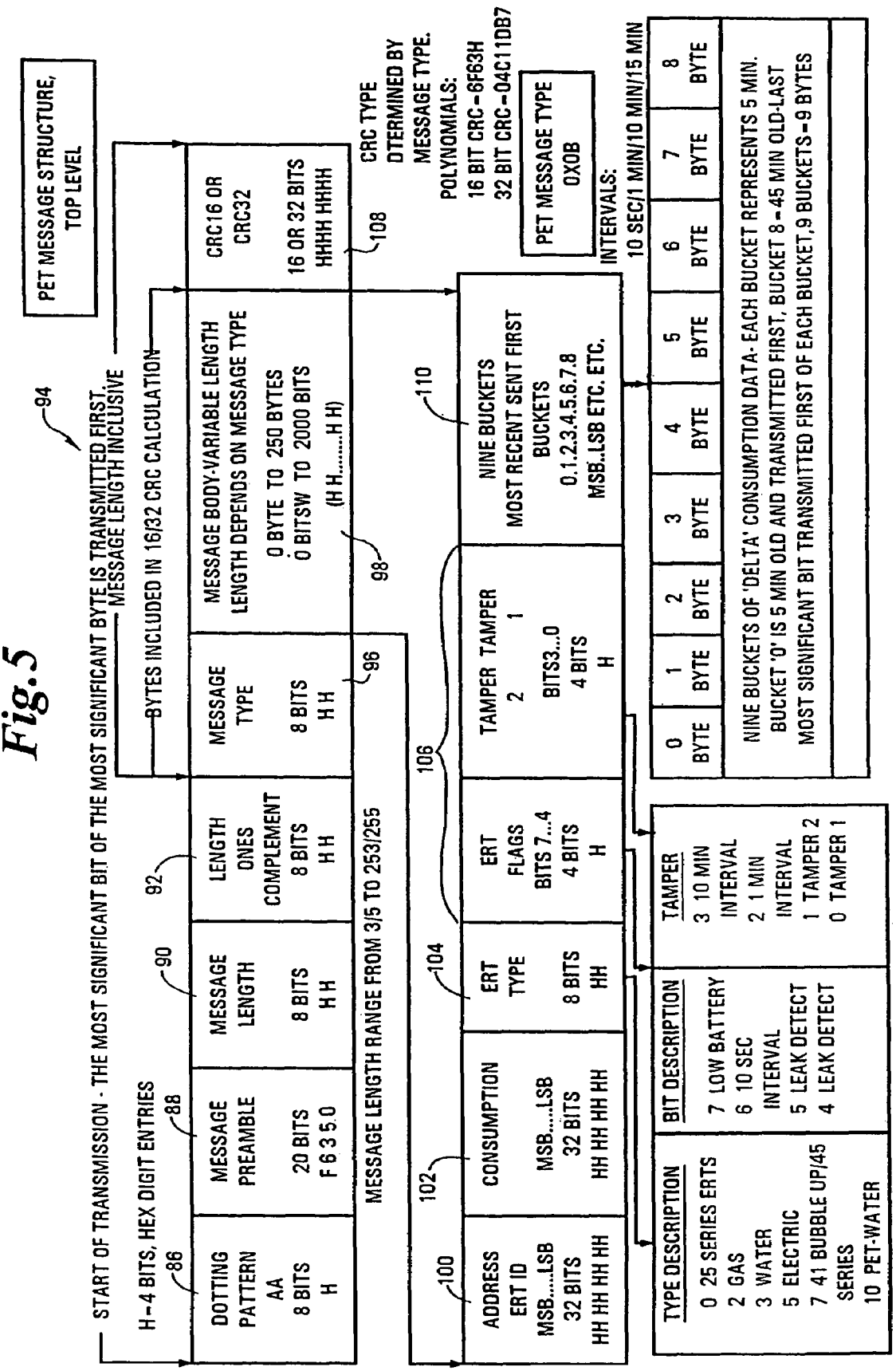
FIG. 5 is another example of a message structure supported by the system of the present invention.
Figure 6:
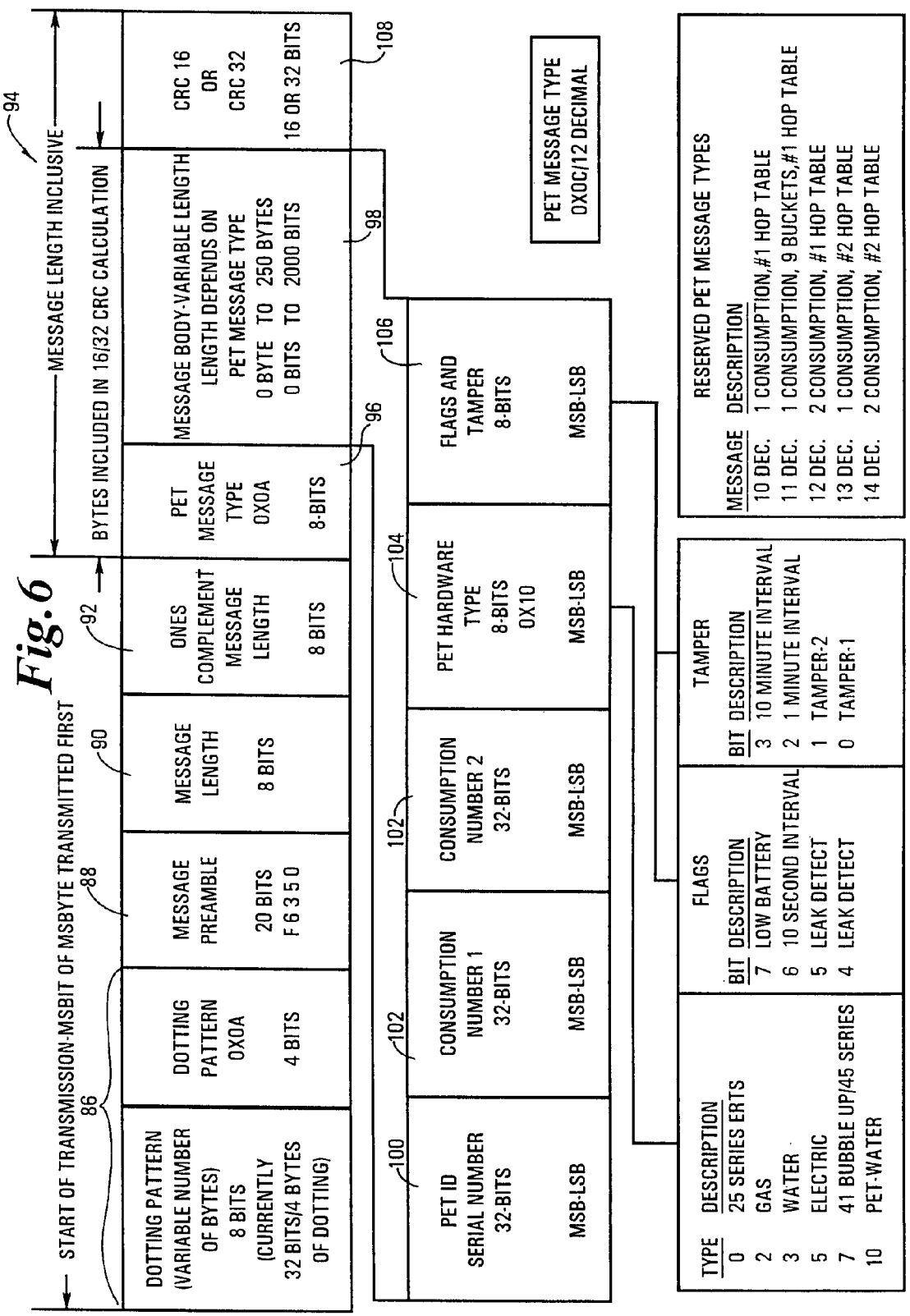
FIG. 6 is another example of a message structure supported by the system of the present invention.
Figure 7:
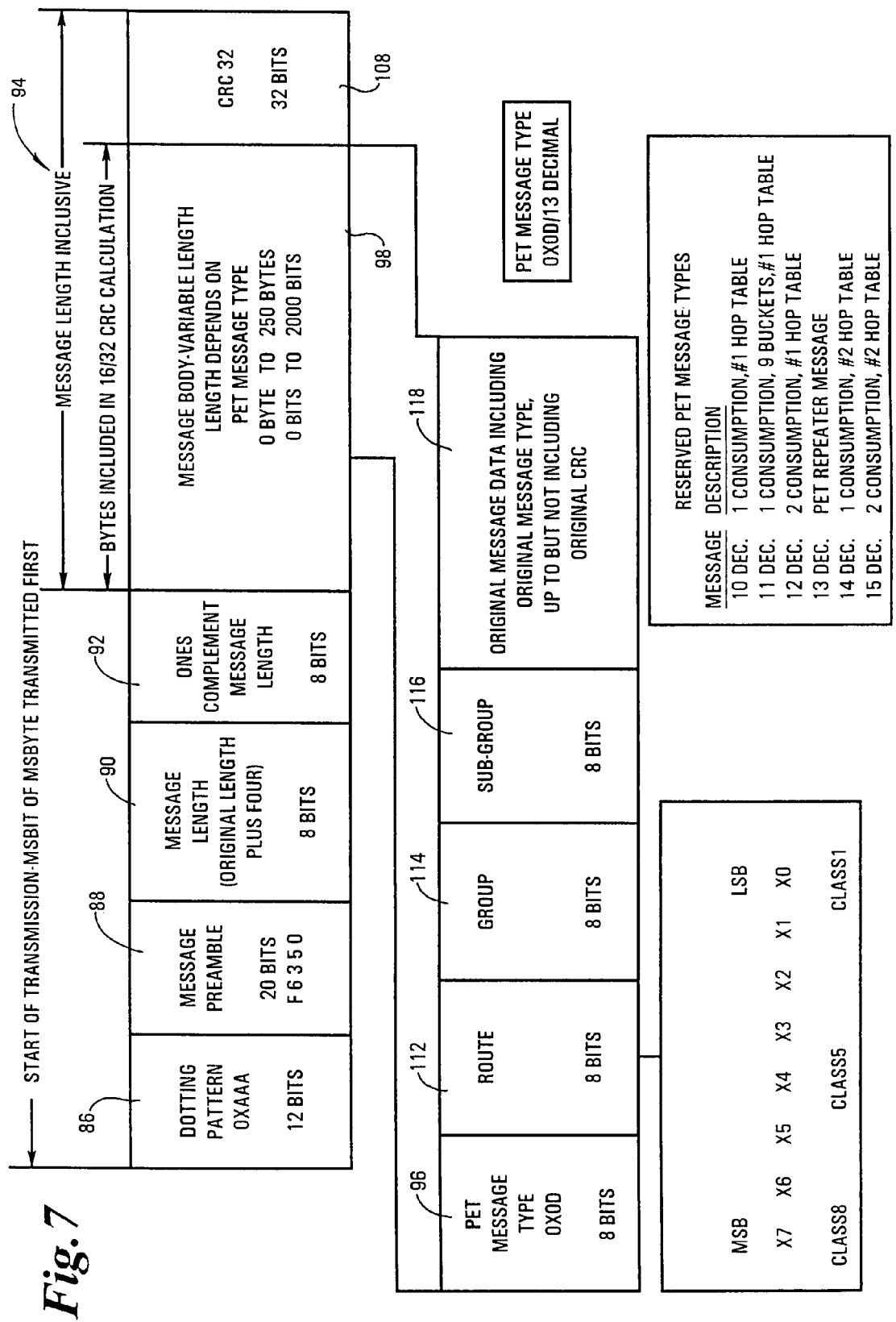
FIG. 7 is another example of a message structure supported by the system of the present invention.
Figure 8:
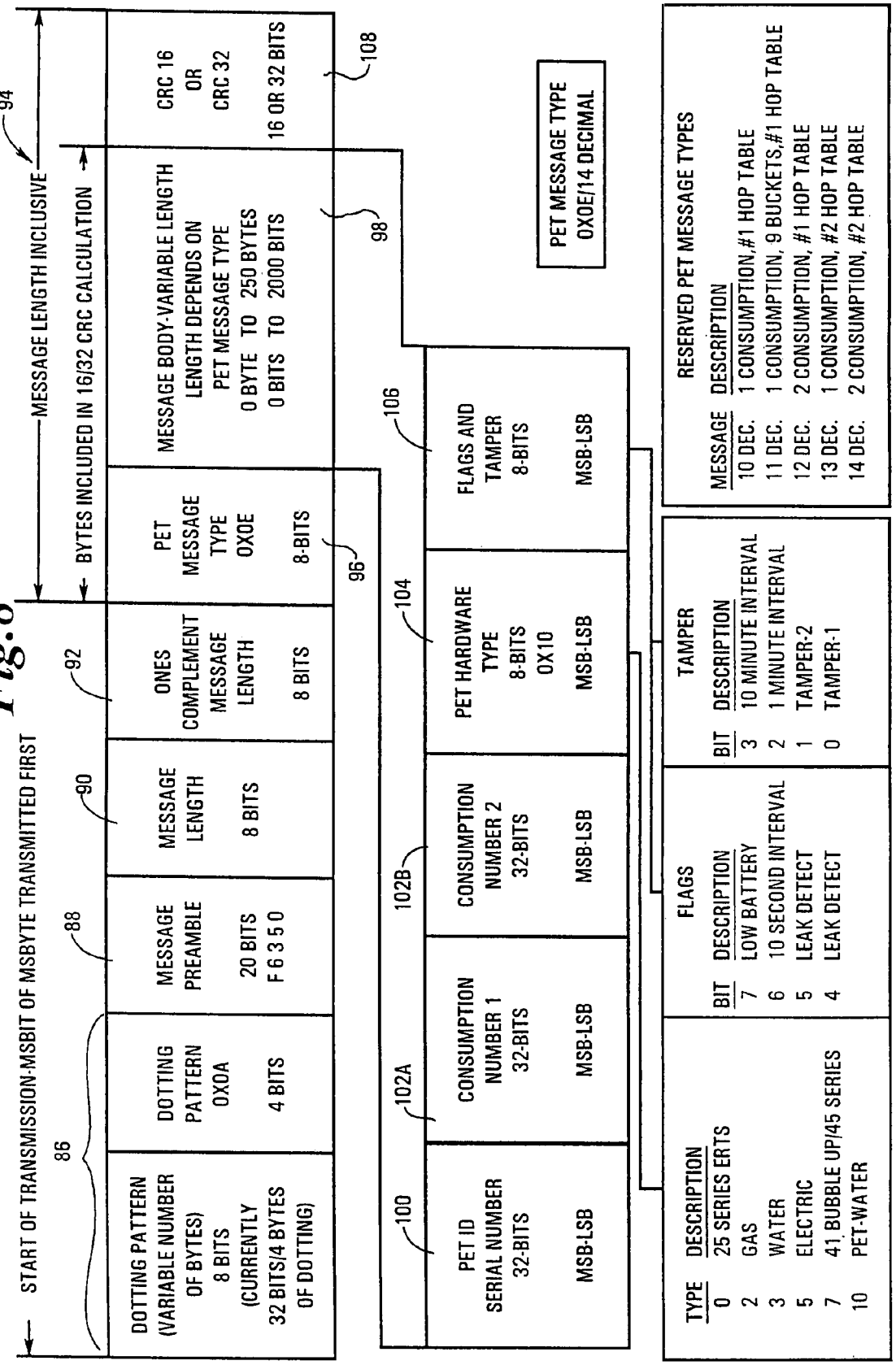
FIG. 8 is another example of a message structure supported by the system of the present invention.
Figure 9:
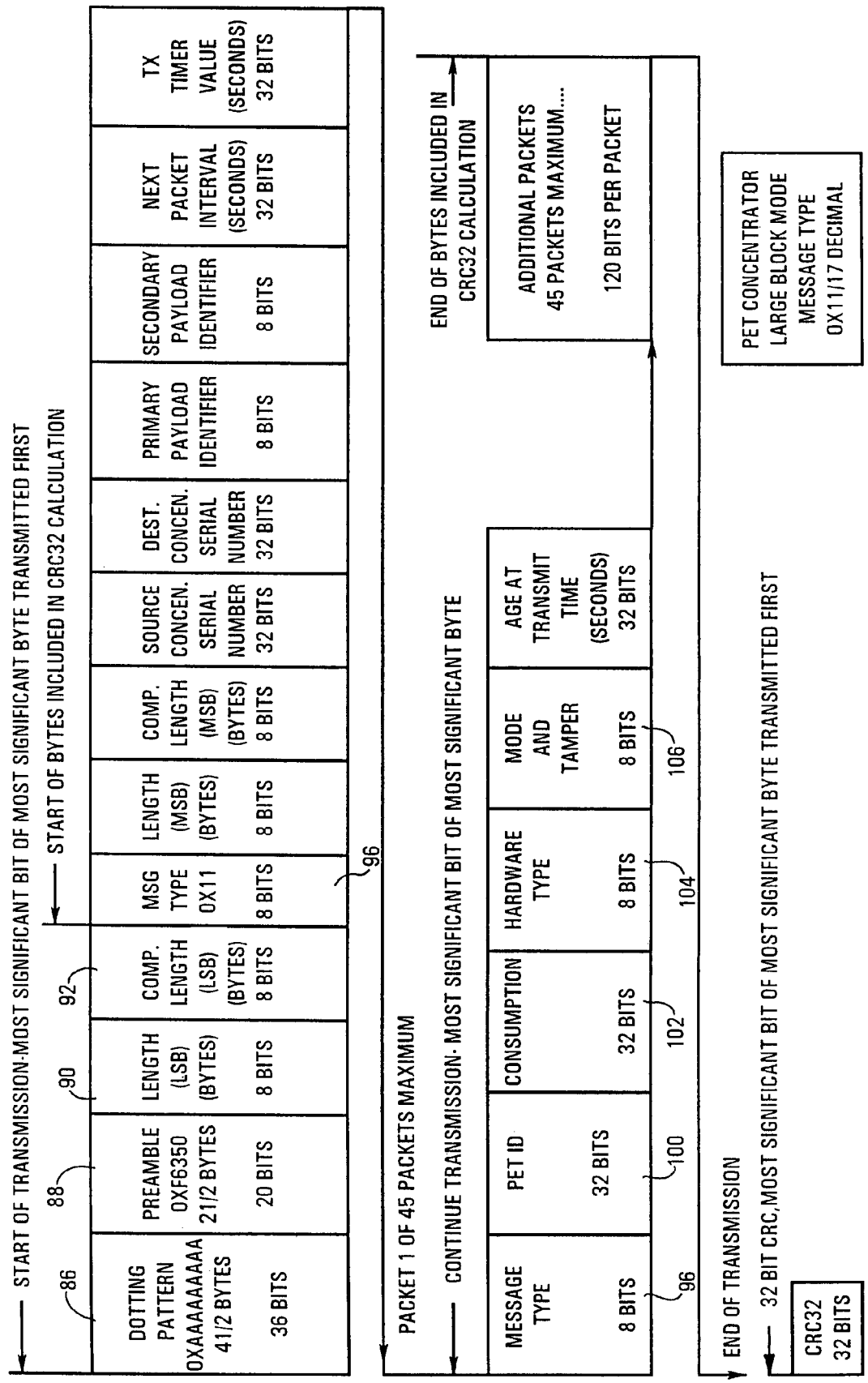
FIG. 9 is another example of a message structure supported by the system of the present invention.

The PET module 22 transmitters preferably support multiple message types, allowing an entirely different message structure to be used by merely changing the message type field. A dotting pattern preferably precedes the message and helps to improve receiver and encoder performance. FIGS. 4-9 provide diagrams of the bit sequences that comprise the various message types. FIG. 4 is a type "10" (decimal) message type, FIG. 5 is a type "11" (decimal) message type, FIG. 6 is a type "12" (decimal) message type, FIG. 7 is a type "13" (decimal) message type, FIG. 8 is a type "14" (decimal) message type, and FIG. 9 is a type "17" (decimal) message type. The type of message utilized determines what data is used and what hop sequence is used to transmit the data.

For example, a type "10" message, FIG. 4, transmits the consumption pulse count of register one of the utility meter to which the PET module 22 is connected according to a first pre-programmed hop sequence table. The type "10" message includes a dotting pattern field 86, a message preamble field 88 of four bits, a message length field 90 of eight bits, a one's complement message length field 92 of eight bits and a message 94. The message 94 includes a message type field 96 of eight bits, a message body field 98 of variable length, and a CRC 108 of 16 or 32 bits. The message body field 98 preferably includes the thirty-two bit PET module identification/serial number in field 100, a thirty-two bit consumption pulse count 102 of register one of the utility meter to which the PET module 22 is connected, a hardware field 104 indicating the PET module hardware type, and an eight bit field 106 for flags and tamper bits.

A type "11" message, as shown in FIG. 5, transmits the consumption pulse count of register one of the utility meter to which the PET module 22 is connected according to a first pre-programmed hop sequence table and additionally transmits nine buckets of "delta" consumption data. Each of the nine buckets transmitted represents five minutes of register data wherein bucket "0" is five minutes old and transmitted first while bucket "8" is 45 minutes old and transmitted last. The use of buckets enables the base unit 26 receiver to go back to a desired point in time and reconstruct the consumption data no matter the time at which the base unit 26 actually receives the PET module message transmission. The fields within the message structure are similar to that of the type "10" message with the addition of the nine bytes comprising the nine buckets the message body field 98.

A type "12" message, as shown in FIG. 6, transmits the consumption pulse count of register one and two of the utility meter to which the PET module 22 is connected according to a second pre-programmed hop sequence table. The fields within the message structure are similar to that of the type "10" message with the addition of a second thirty-two bit consumption pulse count field 102 for the consumption data within register two of the utility meter to which the PET module 22 is connected.

A type "13" message, as shown in FIG. 7, is a repeater message type that resends a previously transmitted message. The fields within the message structure are similar to that of the type "10" message with the exception that the message body field 98 incorporates the message type field 96 as well as an eight bit route field 112, an eight bit group field 114, an eight bit sub-group field 116, the original message data that was previously sent within field 118. The use of route, group and subgroup coding allows for minimization of crosstalk between systems and within a system minimizes redundant data in overlapping coverage areas, thereby improving coverage and channel efficiency. The original message data within field 118 includes the original message type, up to but not including the original CRC 108.

A type "14" message, as shown in FIG. 8, is identical in message structure to that of a type "12" message, described above. However, a type "14" message is transmitted according to a second pre-programmed hop sequence table that is different from the first pre-programmed hop sequence table. Multiple hop tables can be programmed into the Pet module to further minimize collisions which further improves RF channel utilization and efficiencies.

A type "17" message, as shown in FIG. 9, is a large block mode message type, wherein up to 45 PET module messages may be transmitted in a single large block. The start of the message structure is similar to that above including fields 86, 88, 90 and 92, as well as a message type field 96. The message length is preferably repeated twice (original and compliment) to improve accuracy of decoding the proper message prior to decoding the full CRC protected message. By utilizing this test early in the message, long false message lengths are greatly minimized and efficient decode recovery for new messages is attained. The source is preferably the local serial number of the unit transmitting. The destination is originally set to zero and within the receiver decoder circuitry, the receiver may be selectively configured to enable the source destination. The primary and secondary payload are block identifiers. The primary payload is defaulted to one, and the second payload is set to the number of PET transmissions contained in that block. The next packet interval preferably identifies a subsequent time for the interval to the next transmission. This interval information allows for selective adjustment of the block transmissions between the repeater and the base station to optimize performance. The transmission counter is used to calculate latency of retransmission so that latency between each retransmission or the original read can be determined. Preferably, the transmission counter of that unit is appended at each retransmission step in the network. At the head end, this information is accurately time stamped with a real time clock that is appended with the latency information to allow for accurate calculation of the actual meter reading time.

While the above represent the structures of the preferred and most often used messages it should be noted that other message types may be used without departing from the spirit or scope of the invention.

II. C. Repeater Unit and Base Unit—Hardware Detail

Figure 10:
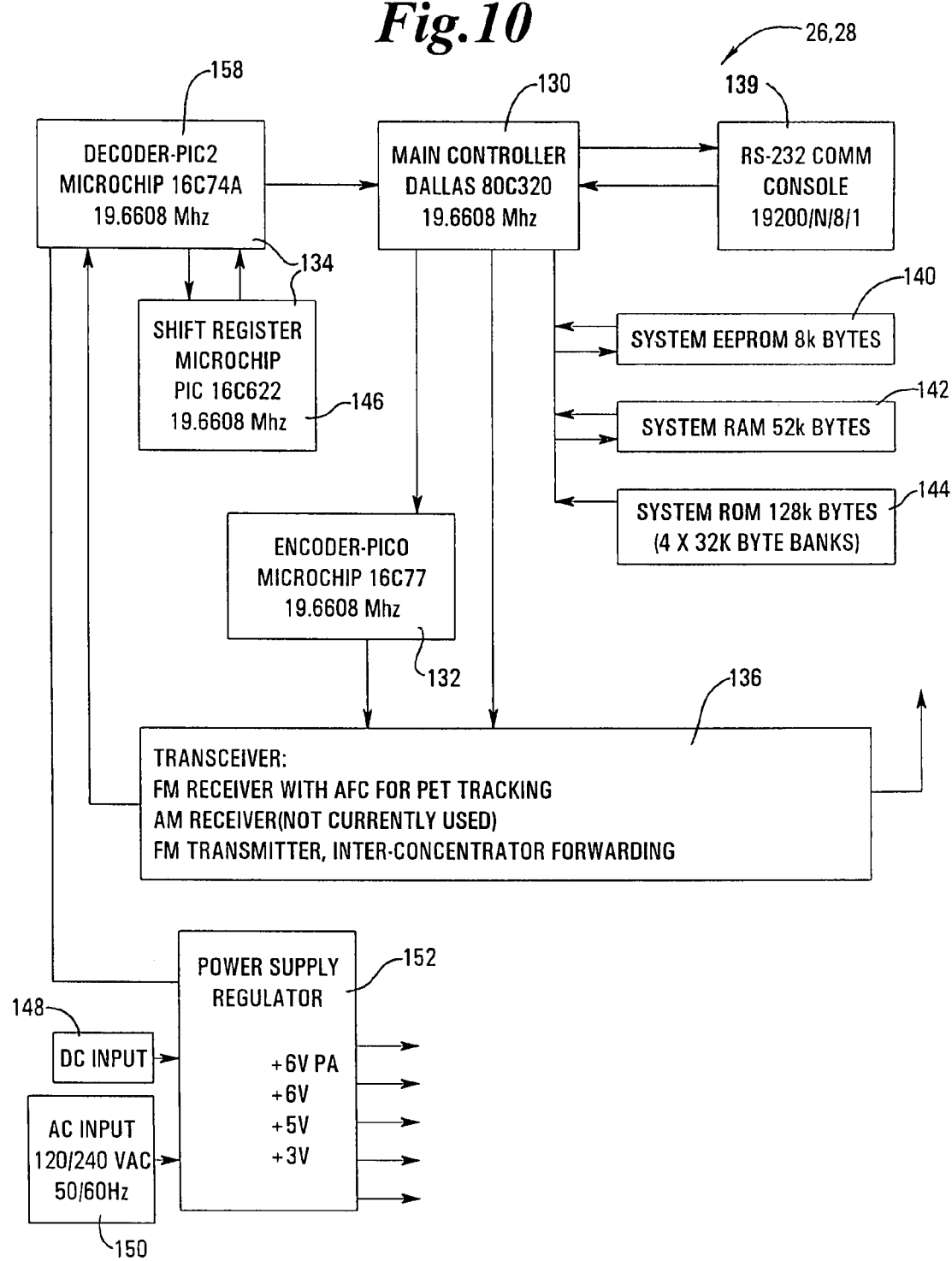
FIG. 10 is a block diagram of the main components that comprise the logic board of both the base unit and the repeater unit of the system of the present invention.

FIG. 10 provides a block diagram of the main components that comprise the base unit 26 logic board, and likewise, the repeater unit 24 logic board. As shown, base unit 26 generally comprises a main controller 130, an encoder 132, a decoder 134, and a transceiver 136. The main controller 130 is connectable via an RS-232 communication line 138 to a console for user programming. Further, the main controller 130 is preferably supported by three different memories: an EEPROM 140, RAM 142, and ROM 144. The main controller 130 generally runs the application and diagnostic software of the base unit 26 as well as handling all external user interfaces. The main controller 130 also controls the actions of the lower level processors on the logic board, which in turn control the base unit's transceiver 136.

The encoder 132 generally handles the low level interface to the RF board of the transceiver 136. The encoder 132 is generally responsible for communications to the synthesizers on the RF board of the transceiver 136 along with controlling the RAKON on the RF board. The decoder 134 generally operates to take raw data from the transceiver 136, to attempt to decode a valid message preamble, and then to buffer that message for transfer to the main controller 130 through use of a shift register microchip 146. The DC inputs 148 and AC inputs 150 for the base unit 26 are regulated as needed by a power supply regulator 152.

The main controller 130 is preferably a Dallas 80C320 and communicates via a single communication protocol with both the encoder 132, preferably a PIC 16C77, and the decoder 134. There are four configuration memory areas that are utilized for the operating parameters of the main controller 130. The default configuration of the base unit 26 is stored in ROM 144 as part of the program code for the main controller 130 and provides the starting point for initializing a new base unit 26. The remaining three areas reside in the EEPROM 140 and allow for changes during the installation process of the base unit 26. Specifically, the remaining three configuration memory areas include a primary configuration table that provides the primary configuration parameters for the main controller 130, a backup configuration table that provides a backup copy of the configuration parameter and is utilized if the primary configuration table is deemed "bad", and a factory setting area that has been programmed with settings for completing a diagnostic mode of operation of the base unit 26.

The encoder 132 controls the transceiver 136 operation and performs the low level activities such as loading the synthesizers, setting the various power levels, switching between transmit and receive operation, and converting the transmitted data streams to Manchester encoded data.

Figure 11:
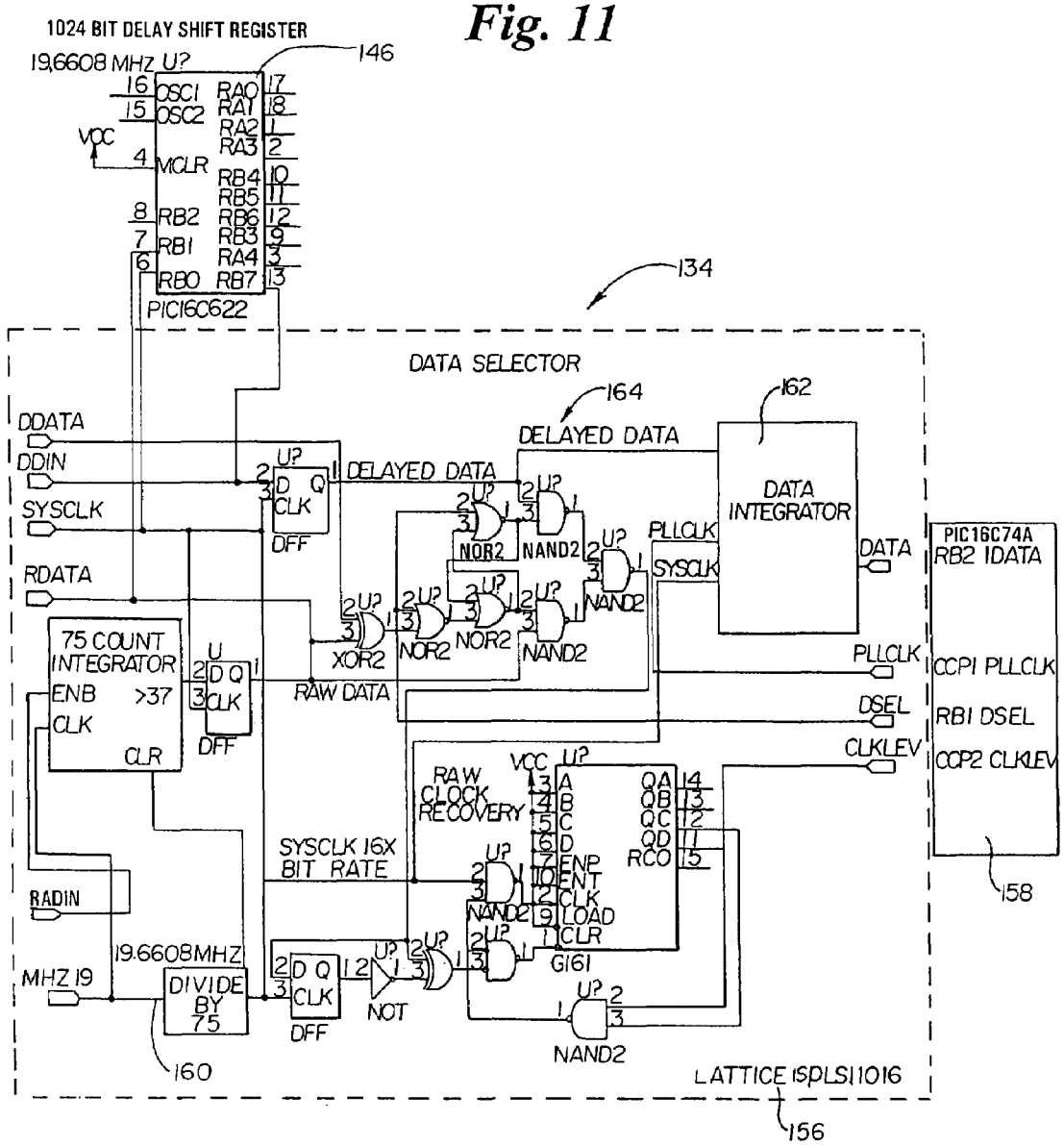
FIG. 11 is a block diagram of the decoder that is preferably used within the logic board of FIG. 10.

The decoder 134 is preferably implemented by a combination of programmable logic and microcontrollers. A block diagram of the decoder 134 is provided in FIG. 11 and depicts the three main parts of the decoder 134. The three main parts of the decoder 134 include a Lattice ISP1016 programmable logic device 156, the shift register microchip 146, which is preferably a PIC16C622 microcontroller utilizing a 1024 bit delay line clocked at 262 Khz, and a PIC16C74A microcontroller 158, which is an EPROM-based microcontroller with an integrated analog-to-digital converter.

Raw noisy radio data is applied to the input of device 156. The signal is synchronized to a 19.6608 MHz clock 160 and fed through a digital integrator 162 to filter any high frequency noise. This filtered signal is sent through the delay shift register microchip 146. After the shift register, the now delayed data signal is resynchronized in device 156. The two existing data streams, i.e., the filtered data signal and the delayed data signal, can be selected by steering logic 164 within device 156 to allow a phase locked loop (PLL) within the microcontroller 158 to lock onto either data signal. Note that the delayed data is always connected to the data integrator 162. The data integrator 162 samples the delayed data at a 16×clock rate and filters each data bit for sampling by microcontroller 158. A digital, nonretriggerable one-shot is configured in the device 156 to provide a raw, noisy clock for the PLL algorithm. The microcontroller 158 provides the PLL for data stream synchronization and assembles the transmitted data bits into data packets. The digital PLL has a frequency lock range of +/−2%. A programmable counter within microcontroller 158 is used to sample each edge of a clock level input. The time between edges (phase) is monitored by microcontroller 158 and an output reconstructed PLL clock produced by microcontroller 158 is adjusted accordingly to provide the final PLL clock used to sample the data stream.

The transceiver 136 includes an FM receiver with automatic frequency control (AFC) for PET module 22 tracking and an FM transmitter that utilizes inter-concentrator forwarding. The FM receiver is preferably a dual conversion super-heterodyne FM receiver with approximately 1.3 MHz intermediate frequency (IF) bandwidth in the high IF, a 360 KHz bandwidth in the low IF and a 20 KHz post-detection bandwidth. The receiver scans the 902 to 928 MHz band by using a synthesized stepping local oscillator (LO) to produce an intermediate 110.6 MHz high IF. The 110.6 MHz IF is buffer amplified and applied to a second mixer in conjunction with a 99.9 second LO which down-converts to a 2nd IF frequency of 10.7 MHz. The 360 KHz IF minimum bandwidth is required to match the 20 dB occupied bandwidth of the PET module 22 and the repeater unit 24 transmitters as well as provide the additional allowance for frequency stability, a component variations, and aging of the base unit 26, the repeater unit 24, and PET module 22. The FM signal is demodulated with a quadrature detector and applied to a data slicer to produce hard-limited 5 volt 16 Kilobits per second data. The data is transferred to the base unit 26 or repeater unit 24 logic board for further processing.

Figure 12:
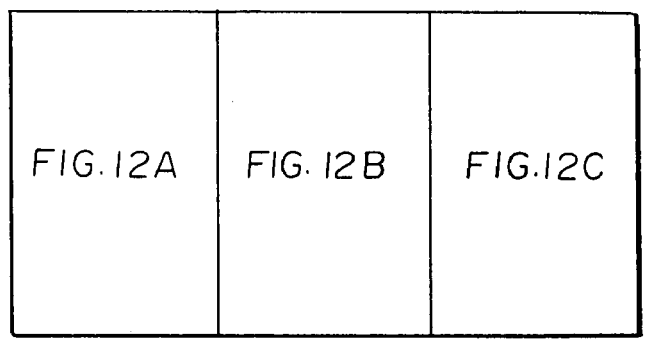
FIG. 12 is a block diagram of the transceiver of the base unit and repeater of the system of the present invention.
Figure 12A:
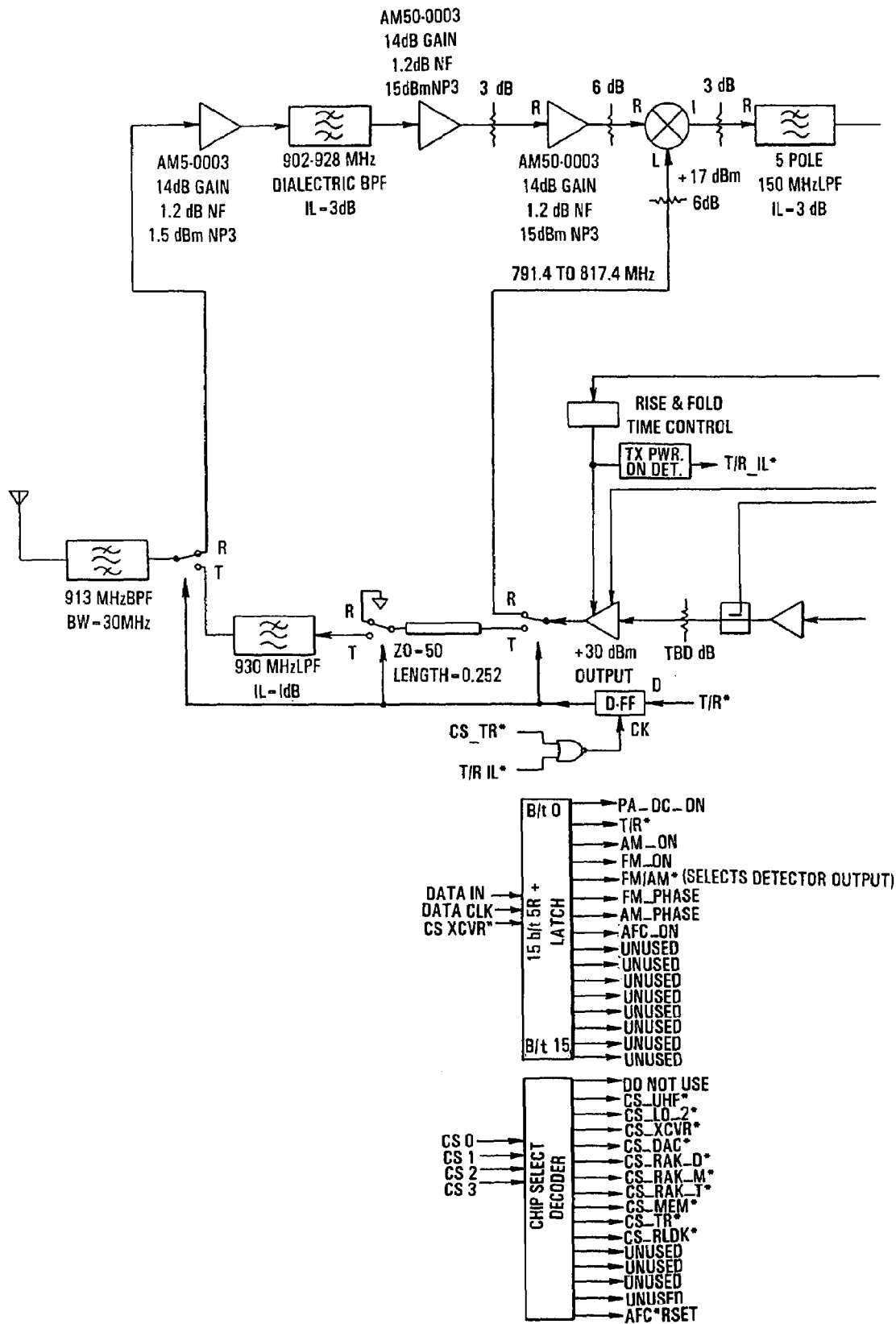
Figure 12B:
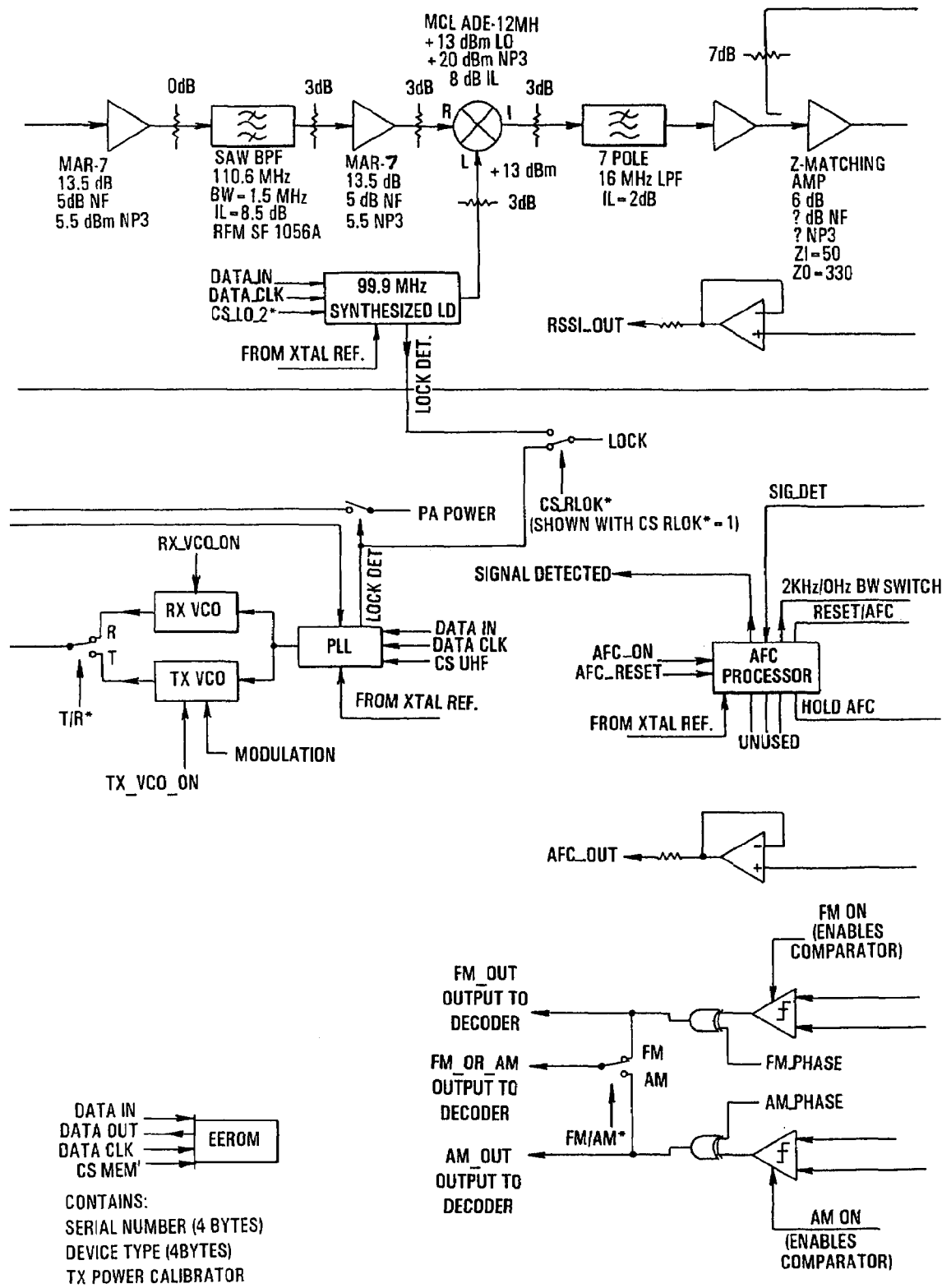
Figure 12C:
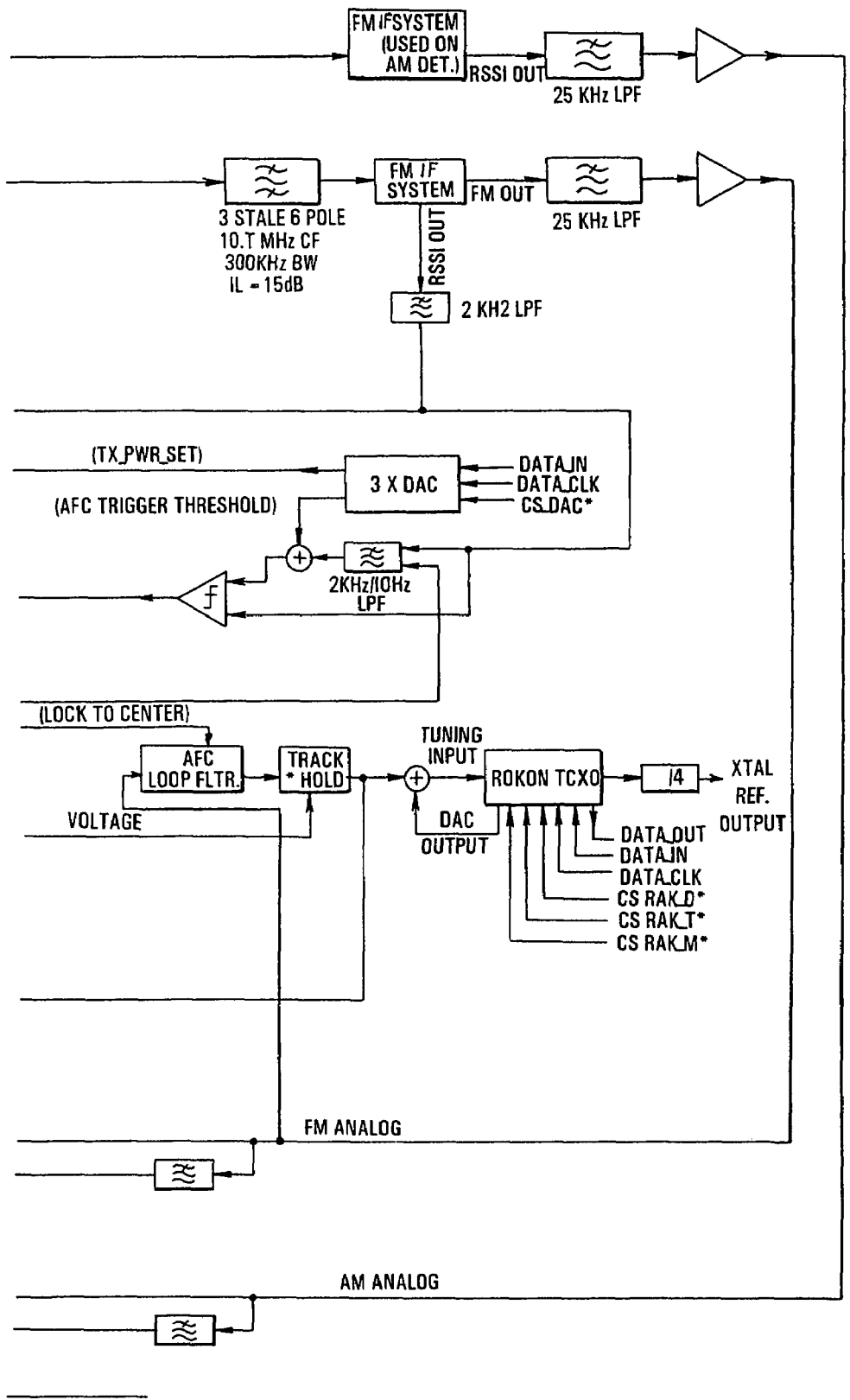
Figure 14:
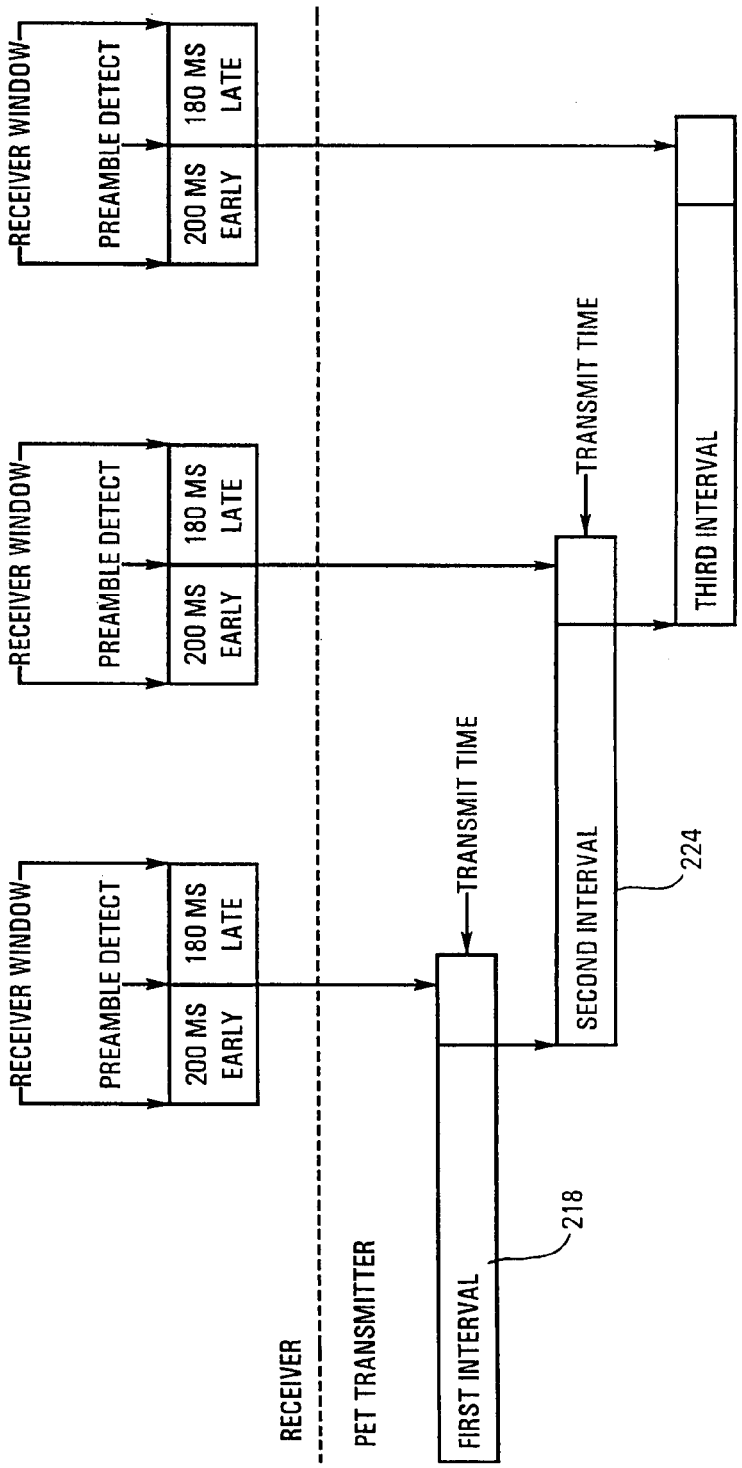
FIG. 14 is a receiver window timing diagram.
Figure 15:
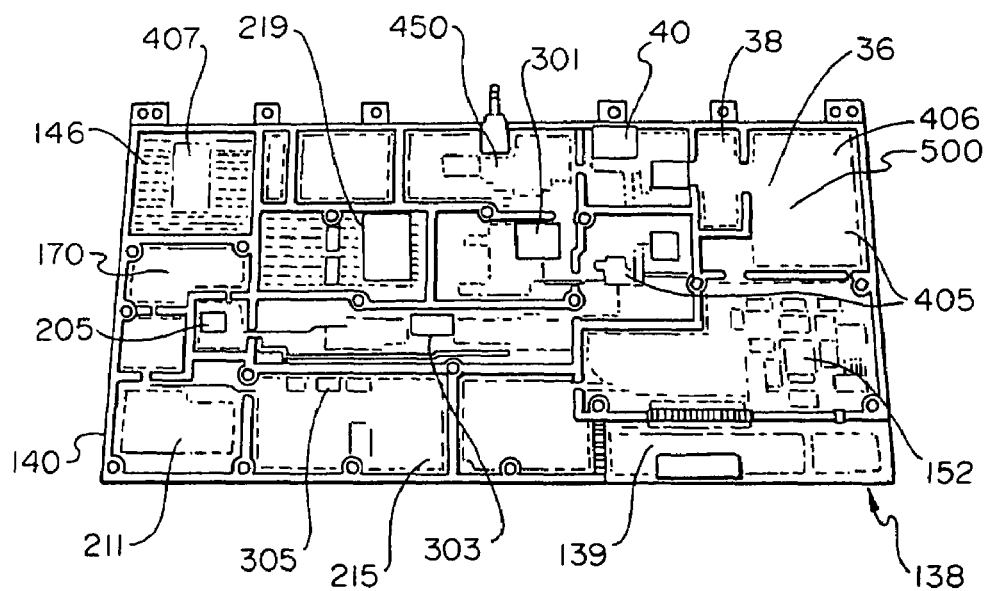
FIG. 15 is a pictorial diagram of a preferred embodiment of the transceiver circuit board of FIG. 10.
Figure 16:
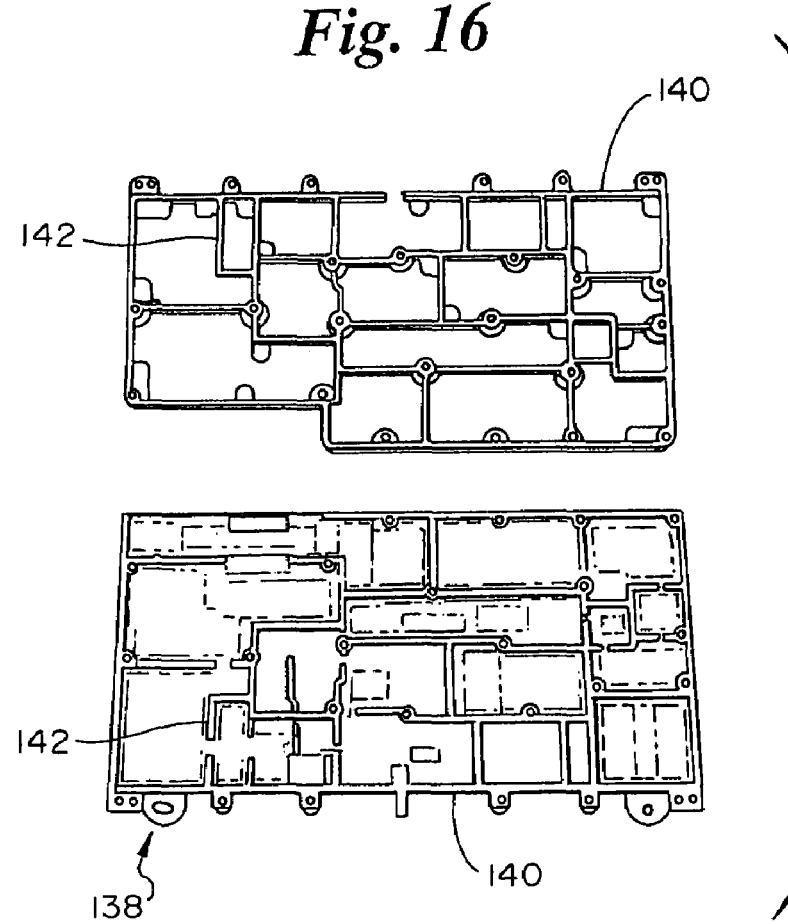
FIG. 16 is a perspective view of a clam shell for the circuit board of FIG. 15.

FIG. 12 provides a detailed block diagram of the transceiver 136. A corresponding pictorial diagram of a preferred embodiment of the RF circuit board 138 implementing transceiver 136 is shown in FIG. 14. The RF board 138 is preferably enclosed within a clamshell 140 as shown in FIG. 15. The clamshell 140 has partitions 142 defined therein that are used for shielding and isolation between various circuits on the RF board 138. The partitions 142 mate with corresponding grounding structures 144 on the RF board 138 to isolate the various portions of the circuitry of RF board 138 when mated with the clamshell 140. Extensive use of feedthroughs are made to eliminate crosstalk between compartments.

II.C.1 Transceiver Hardware—900 MHz Receiver

The 900 MHz receiver noise figure is established primarily by the front end elements composed of filter 301 and amplifier circuits 202 and 203. The RF filter 301 is a BandPass filter with less than a 1 dB insertion loss. The LNA amplifier 202 has a noise figure of approximately 1.2 dB. Amplifier 203 serves to boost gain of the wideband signal and is presented to filter 204. Filter 204 is 3 pole ceramic filter with a bandpass of 25 MHz centered at 915 MHz. Additionally amplifier 202 provides sufficient gain to mask the noise contribution of the passive mixer 205. The sum of insertion losses and noise figure is approximately 2 dB, an additional few tenths of a dB noise figure is contributed by downstream receiver losses and noise figures. The goal is to achieve a system noise figure of less than 3 dB, while simultaneously achieving a high input IP3 performance. Because good receiver input dynamic range and good noise figure are usually conflicting goals, some tradeoff between noise figure and IP3 are to be expected. Amplifier 202 has a gain of approximately 12 dB, amplifier 203 has 12 dB gain; both stages have sufficient output IP3 figures to meet system IP3 requirements.

Mixer 205 is a passive doubly balanced diode mixer with an input IP3 of +18 dBm and conversion loss of approximately 9 dB. Because of the high dynamic range, a medium power LO drive level of +17 dBm is required, this is supplied by the Power Amplifier 253. This Amplifier also provides the PA function for the transmitter. The synthesized stepping VCO 250 operates from approximately 790 MHz to 816 MHz. It is phase-locked to the reference oscillator and is temperature compensation to maintain frequency stability over temperature. The VCO 250 tuning voltage is derived from the synthesizer that is controlled by signals from the logic board. Currently the number of channels in which the unit operates is 25, which are specified in Table 1.

TABLE 1

PET Channels

| Sequence | Frequency | Channel |
|---|---|---|
| 0 | 903.7 | 8 |
| 1 | 904.1 | 10 |
| 2 | 904.9 | 14 |
| 3 | 905.5 | 17 |
| 4 | 906.1 | 20 |
| 5 | 906.7 | 23 |
| 6 | 907.1 | 25 |
| 7 | 907.9 | 29 |
| 8 | 908.5 | 32 |
| 9 | 909.1 | 35 |
| 10 | 909.7 | 38 |
| 11 | 910.3 | 41 |
| 12 | 911.1 | 45 |
| 13 | 919.1 | 85 |
| 14 | 919.9 | 89 |
| 15 | 920.5 | 92 |
| 16 | 921.1 | 95 |
| 17 | 921.7 | 98 |
| 18 | 922.5 | 102 |
| 19 | 922.9 | 104 |
| 20 | 923.5 | 107 |
| 21 | 924.1 | 110 |
| 22 | 924.7 | 113 |
| 23 | 925.3 | 116 |
| 24 | 926.1 | 120 |

The channels indicated in bold in Table 1 are channels identified as acquisition channels which are scanned on a rotating basis. Preferably, there are only 6 acquisitions channels, 3 upper frequency channels and 3 lower frequency channels. The acquisitions channels are selected at the upper and lower ends of the transmission spectrum to allow for backward compatibility with existing Itron ERT® technology by avoiding use the center frequencies used by that technology as acquisition channels for the present invention. Preferably, there are two or more sets of acquisition channels that can be alternated to enable the deployment of multiple utility meter reading systems 20 over the same coverage area without creating interference between the two or more systems. The transceivers 136 are programmed with the acquisition channels.

Amplifier 206 have approximately 14 dB gain and serve to buffer the 110.6 MHz IF signal prior to SAW filter 303; the amplifier 206 has an output IP3 of +30 dBm which maintains the system dynamic range requirement. Filter 303 is the band-limiting device in the 900 MHz receiver to reduce image frequencies and establishes the both input thermal noise floor as well as the nominal selectivity to incoming PET and PET Repeater messages. Filter 303 has a 3 dB bandwidth of 1.5 MHz with a loss of 8.5 dB. An additional 14 dB of IF gain is provided by amplifier 207. The output of amplifier 207 is then down-converted to 10.7 MHz by mixer 208. The LO for conversion by mixer 208 is provided from a synthsized 99.9 MHz VCO 251. The 10.7 MHz signal is then filtered by a 16 MHz Low pass filter 304 and then buffer amplified by amplifier 209 with 23 dB of gain. The signal then is impedanced match to the 3 each-360 KHz bandpass ceramic filters 305 with a loss of 7dB and presented to the FM detector circuitry 211. Detector circuitry 211 is a limiting IF amplifier with approximately 70 dB gain. It features a fast RSSI output and is used for the PETRC unit logic board to determine PET module transmission RF signal strength. The transfer curve of the RSSI output and the RF is logarithmic which means the demodulated amplitude is non-linear with respect to the IF signal amplitude. The RF dynamic range is approximately equal to the gain i.e. 70 dB. The particular detector used requires approximately 40 dB of system gain preceding it in order to operate on the most "linear" portion of the transfer curve and to ensure the system noise figure is not gain limited. The FM information is derived from the Quadrature detector 215 and is applied to a low pass filter made up of 312a and 312b. The demodulated signal is lowpass filtered to improve the baseband signal to noise ratio, and then is applied to comparator 214a which functions as the threshold detector/bit slicer. The 5 volt digital logic is then combined with the exclusive "OR" gate and a FM phasing level to provide the correct phasing of the PET Manchestor coded data to the logic board decoder circuitry.

II.C.2 Transceiver Hardware—900 MHz Transmitter

The following is a detailed discussion of the circuitry utilized in the transmitter portion of the transceiver 136. The PET Repeater transmitter utilizes a synthesized VCO (Voltage Controlled Oscillator) operating in the 900 MHz frequency range. The VCO is made up of transistor 260 and associated components. The output of this circuit is applied to circuit 402 which routes either the received VCO or the transmit VCO depending up the mode of operation (i.e. receive or transmit) to the RF power preamplifier (400) and the synthesizer's input. The output of amplifier 400 is applied to a 6 dB isolation pad and then applied to amplifier 403 which is the final power amplifier. This amplifier provides both the transmitter power output when in the transmit mode and the receiver LO (Local Oscillator) when in the receive mode. Thus the amplifier is operated over a very wide range of frequencies from 790 to 928 Mhz. The output of amplifier 403 when in transmit mode is applied to circuit 404 for antenna switching to either the receiver's or the transmitter's band pass filter 325. The output of filter 325 is applied to a second antenna switch which is low pass filtered and applied to switch 450. Switch 450 is the final output antenna switch before being band pass filtered and applied to the output connector.

The transmitter and receiver utilize an LMX 2316 synthesizer 500. This synthesizer 500 is controlled through the use of chip selects, data and clock lines from the logic board's microprocessor. The 4.1 MHz reference signal obtained from the DCXO provides the synthesizer 500 with a very accurate frequency/time base. The output from the synthesizer 500 utilizes a 1 KHz 3 dB loop bandwidth before being applied to the VCO 400.

In the transmit mode, modulation data originating from the logic board's microprocessor is applied to resistor 543. Resistor 543 provides deviation adjustment for the transmitter's modulator circuitry 510. The transmitter's modulated circuitry 510 is composed of primarily ceramic resistor 544 which is loosely capaticitively coupled to the transmit VCO 400 in order to FM modulate the transmitter. Typically, the modulation setting is +/−75 KHz.

II.C.3 Transceiver Hardware—Reference Frequency Oscillator

Oscillator 219 is a temperature sensed, digitally corrected crystal oscillator operating at 16.4 MHz. Relatively high stability is achieved by calibrating the oscillator 219 at half degree Celsius increments, performed by the device manufacturer. Additionally, the correction data is a digital word which is fed into a D/A converter which in turn tunes the oscillator to the correct frequency. The calibration data is stored in an EEPROM module. The reference oscillator 219 is driven by the logic board; the following sequence of events takes place for every half degree change: (1) Encoder reads the temp sensor, data is clocked out of the sensor over the serial bus. (2) Encoder reads the appropriate memory location in the EEPROM and retrieves the correction data over the serial bus. (3) Correction data is then redirected to the D/A converter onboard over the serial bus. (4) DAC output drives the varactor in the crystal oscillator to correct the frequency.

Amplifiers 229A and 229B operate as a buffer amplifier and level shifter to provide 5 volt TTL levels to the divide by 4 circuitry 230A and 230B. The output of circuitry 230 is a 4.1 MHz TTL signal that is applied to Amplifier 229 C, D, E inputs which isolate drive levels to individual circuits throughout the transciever board 138.

Oscillator 219 can also be modulated during the receive mode by the AFC (Automatic Frequency Control) circuitry. This is accomplished by combining the AFC output signal with the oscillator 219 DAC output. This is accomplished by circuits 228C and 228D. The output of circuit 228D is then reapplied to the oscillator 219 DAC input.

II.C.3 Transceiver Hardware—Automatic Frequency Control (AFC)

AFC allows proper decoding of PET data transmissions with carrier frequencies separated by as far as +/−60 KHz. This further reduces the cost of the PET module by allowing lower cost less stable crystals as reference frequency. This is preferably accomplished by microprocessor 218 (a single chip microprocessor) and its associated circuitry. The system is triggered by signal detect which is an RSSI threshold level that is determined by the logic board microprocessor. The threshold level adjustment is accomplished through the combination of two band pass filter sections made up of filters 332A, 332B, 332C, and 332D. Microprocessor 218, upon detection of the signal flag, controls analog gates 231A, 231B, and 231C. These gates change the band pass characteristics of filter 328A and 328B which provide an offsetting DC voltage that is proportional to the carrier offsets of the PET transmitter and PET receiver. The offset DC voltage is applied to filter 328C which modulates the reference oscillator 219.

II.C.3 Transceiver Hardware—Power Regulation

The power supply 152 essentially comprises an unregulated supply that provides the input power to three single chip buck switch regulators (not shown). These switcher regulators supply the system +6 volts, +6 volts (PA) and variable supply to charge the system batter if one is connected. From the +6 volt supply, a +5 volt supply is generated from a low overhead linear regulator. Further, a −5 Volt bias supply is then generated from the +5 Volt supply. A +3 Volt reference supply is generated from the +6 Volt supply. A system temperature reference and battery voltage, and current monitor are built into the power supply 152 for use by the main controller 130 so that information can be used to control battery charging in a totally closed loop system. Hard wired voltage comparators (not shown) manage the operation from either the unregulated DC supply 148 or the battery.

II.D. Repeater Unit and Base Unit—Operation

The base units 26 and repeater units 24 utilize transceivers that monitor user configurable acquisition channels until reception of a PET module transmitted message occurs. Once a PET message is decoded the base unit 26 tracks the hopping transmissions by information stored in the base unit 26 memory regarding the pseudo-random hop sequence and time of arrival. Specifically, each PET module 22 hops on its own timing sequence for a certain frequency. The transceiver monitors the PET module messages, which provide a PET module identification/serial number and based on that identification/serial number the unit 24 or 26 knows the time and frequency of transmission of that specific PET module 22. This also allows the unit 24 or 26 to know when collisions in time and frequency may occur and to adjust reception of the PET module messages accordingly.

In operation, the base unit and repeater units are first initialized. Specifically, within the main controller 130 all timers, counters, and a transmit and receive interval is set. The modem, within the base unit 26, is initialized. Further, the main controller 130 establishes its expected PET module message arrival list wherein message arrival times are determined, arrival channels are determined, receiver windows are determined.

Figure 13:
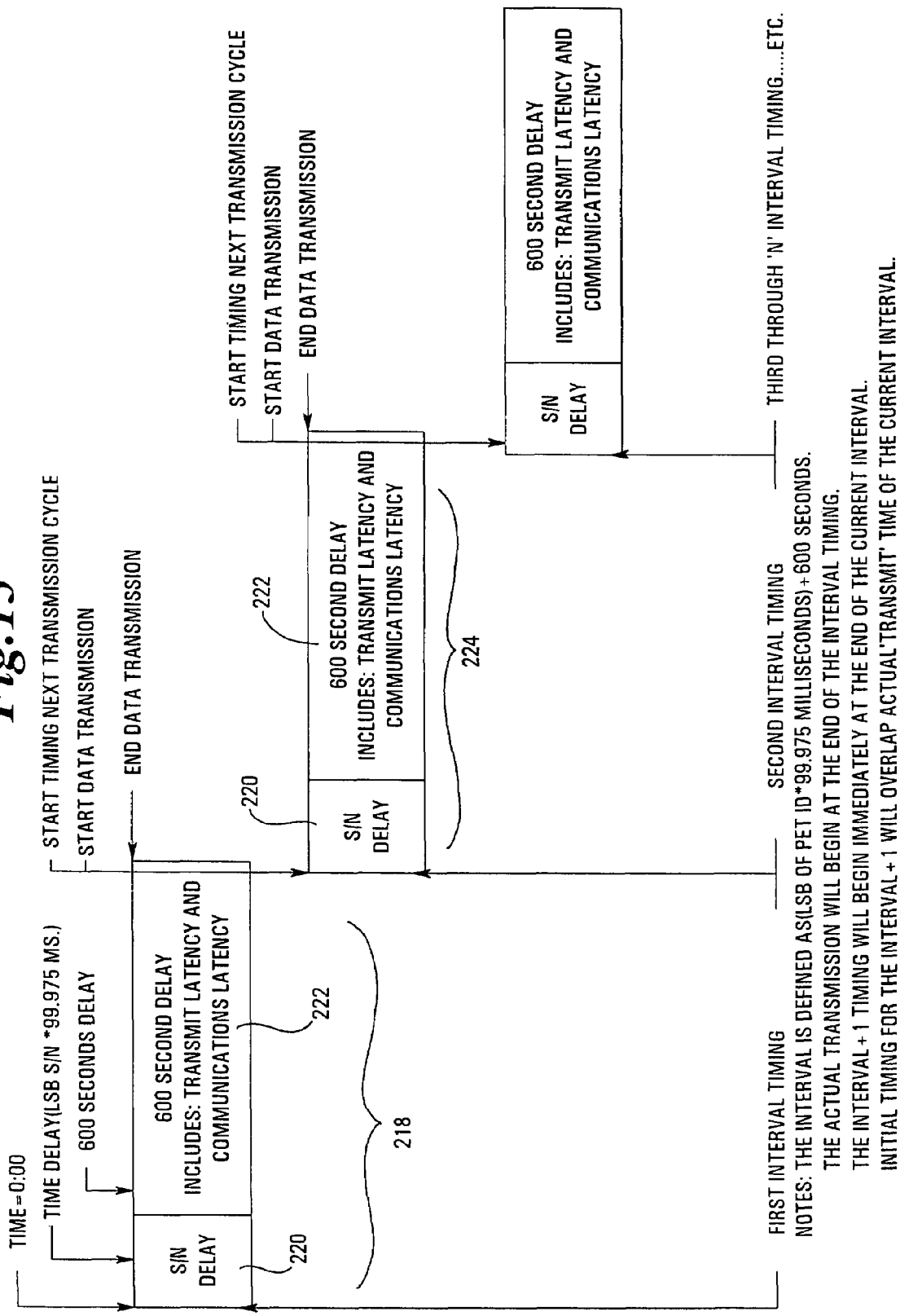
FIG. 13 is a PET module message transmission timing diagram.

An example of PET transmission timing is shown in FIG. 13. As shown, the first PET module data transmission is expected after a first interval timing 218. The first interval timing 218 includes a serial number delay 220, which is defined as the least significant byte (LSB) of the PET module identification/serial number multiplied by 99.975 milliseconds, and a 600 second delay 222. The next interval timing begins immediately at the end of the current interval and, as such, the initial timing for the interval+1, e.g., interval timing 224, overlaps the actual transmit time of the current interval.

An example of receiver window timing is provided in FIG. 14 as related to the interval timing of FIG. 13. As shown, the transceiver 136 of the repeater unit 24 or base unit 26 requires a minimum window of 380 milliseconds to compensate for oscillator crystal tolerances and the preamble detection of the PET module message in order to receive the PET module message. Knowing the first interval timing 218, the main controller 130 can direct the transceiver 136 to start receiving 180 milliseconds before the data transmission, allow 20 milliseconds for preamble detection, and provide another 180 milliseconds after preamble detect.

Initialization of the main controller 130 also includes establishing how missed PET module messages will be handled, when PET modules will be dropped from an expected arrival list, and how to adjust for drift. The parameters for receiving large blocks through transceiver 136 are also established. For example, upon receiving a large block of data through transceiver 136 it is decoded and the main controller 130 operates to verify the integrity of the data. From the verified data the main controller 130 then compares the PET module identification/serial numbers to the main controller's local list of PET modules 22. The main controller 130 also determines the timing interval from the data as well as the hopping sequence being used, and calculates the arrival time for the next large block data receive. This calculation is adjusted by the main controller if the receive window is missed. Finally, the main controller enters and stores the data within its PET module database for later transmission.

Additional initialization parameters for the main controller 130 include how to manage PET module messages to be forwarded, e.g., placed within PET module database, and how to manage the transmitting schedule for large blocks, and database management, e.g., how long should a PET module live within the database, how the database should be updated with new PET modules, and how the database is to be cleaned up on a regular interval. The main controller 130 is also preferably initialized to count the number of successful hits on each acquisition channel.

Once initialized, the main controller 130 checks the CRC in the primary configuration table of EEPROM 140. If the CRC is valid then the configuration parameters in the primary configuration table are loaded into the main controller. Otherwise, the main controller checks the CRC in the backup configuration table of EEPROM 140 and, if valid, re-writes the primary configuration table from the back-up table whereby the configuration parameters are then loaded into the main controller 130. With the configuration parameters loaded, the main controller operates to format a PET module data table and additionally commands that the decoder 134 start operation to decode those PET module messages that have been received by the transceiver 136.

The decoder 134 operates to detect PET module message transmission packets by performance of the following steps:
1. Detecting a valid preamble while the phase locked loop (PLL) of microcontroller 158 is locked onto the filtered data signal.
2. Switching the PLL tracking of microcontroller 158 to the delayed data signal, which is produced as described earlier.
3. Notifying the main controller 130 of the valid preamble detection.
4. Shifting the remainder of the message packet, i.e. the portion beyond the preamble, into the decoder microcontroller 158 where it is transmitted to the main controller 130.
5. Switching PLL tracking back to the filtered data signal to begin preamble searching of message packets again.

If a valid, decoded data packet from a PET module 22 is available from the decoder 134, the main controller 130 operates to read the data packet and determine if it is to be processed by the unit 24 or 26. In the case of a repeater unit 24, the repeater unit 26 builds a record and stores the decoded data therein. Upon reaching the time at which the current repeater unit 24 is to transmit, the stored PET module message data is encoded by the encoder 132 and forwarded to the next repeater unit 24 or base unit 26 via FHSS RF. This process is repeated until all current PET module messages have been sent to a base unit 26.

The encoder 132 receives its commands and data via the PSP (parallel slave port) from the main controller 130. During the encoding process, data arrives at the encoder 132 in a binary format and is converted to a Manchester encoded format for transmission; the method of modulation is FM and the Manchester data provides an FM deviation modulation technique. The main controller 130 maintains a steady flow of "bytes to transmit" as the encoder clocks the bits out at an accurate pace thereby controlling the modulation input to the transmitter of the transceiver 136. At the start of the data stream the main controller 130 preferably includes a length byte and a transmitter tuning byte to direct the encoder's setup operation. In return, the encoder 132 sends a response to the main controller 130 for every command or string of data it receives to ensure that a complete transaction has occurred. The encoder 132 preferably responds with the first character of the received data as the transaction acknowledgement.

Upon the PET module message data reaching a base unit 26 via a PET module 22 or repeater unit 24, the main controller 130 of that base unit 26 determines if the PET module 22 that originated the message is within its PET module data table. If so, the data buffer for this PET module 22 within the table is updated with the new PET module data after having been decoded, the data is time-stamped with the current timer value, and the number of message receives for this PET module 22 is incremented. If the PET module 22 that sent the message has not been previously established within the main controller's data table, and there is room for a new table entry, the main controller 130 operates to create that new table entry for the PET module, to store the message data in the data buffer, set the message receive count to one, and time stamp the data. If the main controller has no room for a new PET module, the message data is simply discarded by the main controller 130.

Upon establishing and storing PET module messages, the base unit 26 operates to transmit the message data, including the time stamp and message receive counts, per PSTN or cellular telephone to the head-end meter reading software 28 for analysis and other desired uses.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. In an automatic meter reading (AMR) system comprising a plurality of utility meter end point modules that generate and transmit utility consumption data, and at least one AMR system receiver configured to receive consumption data transmitted by the end point modules by way of frequency hopping spread spectrum transmission, a method of communicating between a first end point module and the receiver, the method comprising:

maintaining, at the receiver, transmission profile information for the first end point module that represents at least a frequency hopping pattern used by the first end point module;

transmitting, by the first end point module, a first message, wherein the first message includes an identifier of the first end point module;

receiving, by the receiver, the first message;
determining, by the receiver, an identity of the first end point module based on the identifier of the first message to obtain a first determined identity;
determining, by the receiver, frequency hopping information associated with a future second transmission by the first end point module based on the first determined identity of the first end point module to obtain a first set of determined frequency hopping information;
predicting, by the receiver, whether the future second transmission will be unsuccessful based on the first set of determined frequency hopping information; and
responding to a predicted unsuccessful future second transmission by adjusting the communicating between the first end point module and the receiver.

2. The method of claim 1, further comprising:
transmitting, by a second end point module, a third message, wherein the third message includes an identifier of the second end point module;
receiving, by the receiver, the third message;
determining, by the receiver, an identity of the second end point module based on the identifier of the third message to obtain a second determined identity;
and
determining, by the receiver, frequency hopping information associated with a
future fourth transmission by the second end point module based on the
determined second identity of the second end point module to obtain second set of determined frequency hopping information;
wherein the step of predicting whether the future second transmission will be unsuccessful includes predicting whether any transmission collision will
occur between the future second transmission by the first end point module, and
the future fourth transmission by the second end point module.

3. In an automatic meter reading (AMR) system comprising a plurality of utility meter end point modules that generate and transmit utility consumption data messages, and at least one AMR system reader configured to receive consumption data messages transmitted by the end point modules, a method of operating a first reader, the method comprising:
determining a message arrival time for a future first message to be transmitted by a specific end point module;
predicting, by the first reader, whether the first message will be successfully communicated; and
adjusting reception activity of the first reader according to a result of the predicting step.

4. The method of claim 3, wherein the step of determining is based on an end point module message arrival list stored in the reader.

5. The method of claim 3, comprising:
transmitting the first message by a first end point module on a first frequency hopping spread spectrum (FHSS) channel; and
prior to the step of transmitting, determining, by the first reader, that the first message will be arrive on the first FHSS channel.

6. The method of claim 3, further comprising:
initializing the first reader, including establishing logic for handling any missed end point module messages.

7. An automatic meter reading (AMR) system receiver for receiving radio transmissions from a plurality of utility meter end point modules that generate and transmit utility consumption data by way of frequency hopping spread spectrum transmission, the AMR system receiver comprising:
a radio receiver; and
a controller programmed to:
maintain transmission profile information for ones of the plurality of end point modules, the transmission profile representing at least a frequency hopping pattern used by at least a first end point module;
operate the radio receiver to engage in radio communications with the first end point module, wherein the radio communications include a first message originated by the first end point module that includes an identifier of the first end point module;
determine an identity of the first end point module based on the identifier of the first message to obtain a first determined identity;
determine frequency hopping information associated with a future second transmission by the first end point module based on the first determined identity of the first end point module to obtain a first set of determined frequency hopping information;
predict whether the future second transmission will be unsuccessful based on the first set of determined frequency hopping information; and
respond to a predicted unsuccessful future second transmission by adjusting the radio communications with first end point module.

8. The AMR system receiver of claim 7, wherein the AMR system receiver is of a type selected from the group consisting of: a repeater, and a base unit.

9. An automatic meter reading (AMR) system receiver for receiving radio transmissions from a plurality of utility meter end point modules that generate and transmit utility consumption data by way of frequency hopping spread spectrum transmission, the AMR system receiver comprising:
a radio receiver; and
a controller programmed to:
determine an arrival time for a future first transmission to be transmitted by a specific end point module;
produce a prediction of whether the first message will be successfully communicated; and
adjust operation of the receiver according to the prediction.

10. The AMR system receiver of claim 9, wherein the AMR system receiver is of a type selected from the group consisting of: a repeater, and a base unit.

11. The AMR system receiver of claim 9, wherein the controller maintains an endpoint module transmission arrival list.

12. The AMR system receiver of claim 9, wherein the controller is configured with logic for handling any missed end point module transmissions.

* * * * *

UNITED STATES PATENT AND TRADEMARK OFFICE
CERTIFICATE OF CORRECTION

PATENT NO. : 7,283,580 B2
APPLICATION NO. : 09/911840
DATED : October 16, 2007
INVENTOR(S) : Scott Cumeralto and John MacConnell It is certified that error appears in the above-identified patent and that said Letters Patent is hereby corrected as shown below:

Column 2, line 17, please delete "of".

Column 2, line 60, please delete "system" and insert in its place --systems--.

Column 3, line 5, please delete "were" and insert in its place --where--.

Column 3, line 12, please delete "Tap Watch®" and insert in its place --TapWatch®--.

Column 3, line 18, please delete "transmission" and insert in its place --transmissions--.

Column 4, line 29, please delete "simplifies" and insert in its place --simplified--.

Column 12, line 17, after "buckets" please insert --of--.

Column 12, line 46, please delete "Pet" and insert in its place --PET--.

Column 15, line 12, after "204 is" please insert --a--.

Column 15, line 14, after "Additionally" please insert --,--.

Column 16, line 1, please delete "acquisitions" and insert in its place --acquisition--.

Column 16, line 3, please delete "acquisitions" and insert in its place --acquisition--.

Column 16, line 5, after "avoiding use" please insert --of--.

Column 16, line 13, please delete "have" and insert in its place --has--.

Column 16, line 18, please delete "the both" and insert in its place --both has--.

Column 16, line 25, please delete "synthsized" and insert in its place --synthesized--.

Column 16, line 26, please delete "Low" and insert in its place --low--.

Column 16, line 18, please delete "impedanced" and insert in its place --impedance--.

Column 17, line 51, please delete "transciever" and insert in its place --transceiver--.

Column 18, line 20, please delete both instances of "Volt" and insert in its place --volt--.

Column 18, line 21, please delete both instances of "Volt" and insert in its place --volt--.

UNITED STATES PATENT AND TRADEMARK OFFICE
CERTIFICATE OF CORRECTION

PATENT NO. : 7,283,580 B2
APPLICATION NO. : 09/911840
DATED : October 16, 2007
INVENTOR(S) : Scott Cumeralto and John MacConnell It is certified that error appears in the above-identified patent and that said Letters Patent is hereby corrected as shown below:

Column 20, line 32, please delete "message receive" and insert in its place --messages received--.

Column 21, line 52, please delete "step".

Signed and Sealed this

Fifteenth Day of July, 2008

JON W. DUDAS
*Director of the United States Patent and Trademark Office*